US012574391B2

(12) United States Patent
Yamaoka

(10) Patent No.:   US 12,574,391 B2
(45) Date of Patent:     Mar. 10, 2026

(54) COMPUTER-READABLE RECORDING MEDIUM STORING INFORMATION MANAGEMENT PROGRAM, INFORMATION MANAGEMENT METHOD, INFORMATION PROCESSING DEVICE, AND INFORMATION SHARING SYSTEM

(71) Applicant: Fujitsu Limited, Kawasaki (JP)

(72) Inventor: Mebae Yamaoka, Kawasaki (JP)

(73) Assignee: Fujitsu Limited, Kawasaki (JP)

( * ) Notice:   Subject to any disclaimer, the term of this patent is extended or adjusted under 35 U.S.C. 154(b) by 235 days.

(21) Appl. No.: 18/334,762

(22) Filed:   Jun. 14, 2023

(65)   Prior Publication Data

US 2024/0106834 A1    Mar. 28, 2024

(30)   Foreign Application Priority Data

Sep. 27, 2022   (JP) ................................. 2022-153900

(51) Int. Cl.
*H04L 9/40*        (2022.01)
(52) U.S. Cl.
CPC ................................. *H04L 63/126* (2013.01)
(58) Field of Classification Search
CPC ..... H04L 9/006; H04L 9/3247; H04L 63/126; G06Q 30/0282; G06Q 30/0609; G06Q 30/0631
See application file for complete search history.

(56)   References Cited

U.S. PATENT DOCUMENTS

| | | | |
|---|---|---|---|
| 9,660,978 B1* | 5/2017 | Truskovsky | ........ H04L 63/0823 |
| 11,012,233 B1 | 5/2021 | Uhr et al. | |
| 2012/0221479 A1* | 8/2012 | Schneck, III | ...... G06Q 30/0631 |
| | | | 705/347 |
| 2012/0311663 A1* | 12/2012 | Seidl | .................. H04L 63/0815 |
| | | | 726/1 |

(Continued)

FOREIGN PATENT DOCUMENTS

| | | |
|---|---|---|
| WO | 2013/008778 A1 | 1/2013 |
| WO | 2022/030570 A1 | 2/2022 |

OTHER PUBLICATIONS

EESR—Extended European Search Report dated Dec. 4, 2023 for corresponding European Patent Application No. 23178636.9 [8 pages].

(Continued)

*Primary Examiner* — Eric W Shepperd
(74) *Attorney, Agent, or Firm* — Fujitsu Intellectual Property Center

(57)        ABSTRACT
A non-transitory computer-readable recording medium storing an information management program for causing a computer to execute processing including: receiving distribution information obtained by attaching, to distribution content to be distributed by a user, attribute information on the user that includes signature information that is signed by an issuing authority that issues information regarding an attribute of the user and that proves that the issuing authority has issued the attribute information; verifying whether the attribute information on the user included in the distribution information is the attribute information issued by the issuing authority, by using the signature information; and outputting the distribution content, based on a verification result.

5 Claims, 18 Drawing Sheets

(56)                    References Cited

U.S. PATENT DOCUMENTS

| | | | | |
|---|---|---|---|---|
| 2013/0219184 | A1* | 8/2013 | Amaya Calvo ....... | H04L 9/3247 |
| | | | | 713/176 |
| 2014/0173287 | A1 | 6/2014 | Mizunuma | |
| 2014/0351907 | A1 | 11/2014 | Noble | |
| 2016/0119147 | A1* | 4/2016 | Saidalavi ............... | G06Q 10/10 |
| | | | | 713/176 |
| 2017/0103472 | A1* | 4/2017 | Shah ......................... | H04L 9/32 |
| 2018/0182001 | A1* | 6/2018 | Ghoshal ............. | G06Q 30/0282 |
| 2018/0232515 | A1* | 8/2018 | Guo ........................ | G06F 21/41 |
| 2021/0209070 | A1* | 7/2021 | Latorre ................. | H04L 9/0637 |
| 2021/0218574 | A1* | 7/2021 | Mao ........................ | H04L 63/04 |
| 2021/0256505 | A1* | 8/2021 | Peng .................... | H04L 9/0894 |
| 2022/0272085 | A1* | 8/2022 | Novotny ............. | G06F 16/2379 |
| 2023/0230144 | A1* | 7/2023 | Lavasanijou ...... | G06Q 30/0631 |
| | | | | 705/26.7 |
| 2023/0410159 | A1* | 12/2023 | Zavesky ........... | G06Q 30/0201 |
| 2024/0022908 | A1* | 1/2024 | Baskaran ........... | H04W 12/069 |

OTHER PUBLICATIONS

EPOA—European Office Action dated Sep. 30, 2025 for corresponding European Patent Application No. 23178636.9 [12 pages].
JPOA—Japanese Office Action mailed Dec. 23, 2025 for corresponding Japanese Patent Application No. 2022-153900 with machine translation. ** Remaining U.S. References cited in the JPOA were previously submitted in the IDS filed on Jan. 19, 2024.

* cited by examiner

VERIFIABLE CREDENTIAL 10a

CREDENTIAL METADATA — ISSUANCE INFORMATION (CREDENTIAL INFORMATION) TYPE TIME STAMP, ETC.

CLAIM (s) — NAME, ADDRESS, ETC. CONSTITUTING CREDENTIAL INFORMATION

PROOF (s) — ELECTRONIC SIGNATURE OF ISSUING PARTY DID OF ISSUING PARTY INFORMATION ON PUBLIC KEY, ETC.

Figure 6:
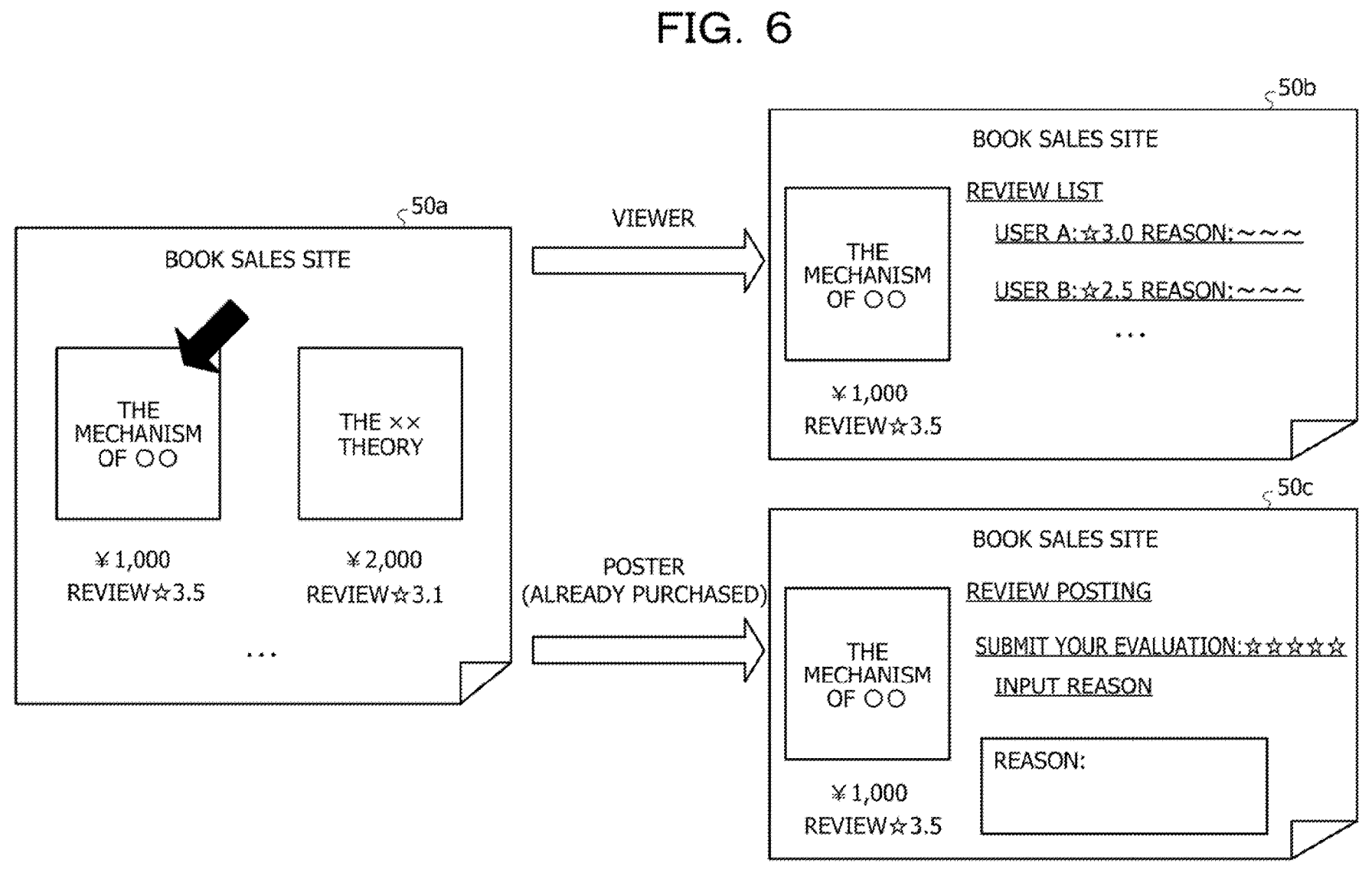

BOOK SALES SITE

THE ×× THEORY

¥2,000
REVIEW☆3.1

THE MECHANISM OF ○○

¥1,000
REVIEW☆3.5

· · ·

VIEWER

50b

BOOK SALES SITE

REVIEW LIST

USER A:☆3.0 REASON:～～

USER B:☆2.5 REASON:～～

· · ·

THE MECHANISM OF ○○

¥1,000
REVIEW☆3.5

POSTER
(ALREADY PURCHASED)

50c

BOOK SALES SITE

REVIEW POSTING

SUBMIT YOUR EVALUATION:☆☆☆☆☆

INPUT REASON

REASON:

THE MECHANISM OF ○○

¥1,000
REVIEW☆3.5

COMPUTER-READABLE RECORDING MEDIUM STORING INFORMATION MANAGEMENT PROGRAM, INFORMATION MANAGEMENT METHOD, INFORMATION PROCESSING DEVICE, AND INFORMATION SHARING SYSTEM

CROSS-REFERENCE TO RELATED APPLICATION

This application is based upon and claims the benefit of priority of the prior Japanese Patent Application No. 2022-153900, filed on Sep. 27, 2022, the entire contents of which are incorporated herein by reference.

FIELD

The embodiments discussed herein are related to a non-transitory computer-readable recording medium storing an information management program, an information management method, an information processing device, and an information sharing system.

BACKGROUND

In recent years, as a service that collects and discloses information published by users and the like, posting type information sharing services including review posting to an electronic commerce (EC) site or the like, a word-of-mouth site, a review site, and the like have become widespread. For example, a sales site that sells books on the Internet accepts reviews and evaluations of the books from purchasers of the books and provides the collected reviews as information regarding the books to site viewers, thereby, for example, promoting sales of the books and ensuring users' trust in the site.

International Publication Pamphlet No. WO 2022/030570, U.S. Patent Application Publication No. 2014/0351907, and U.S. Pat. No. 11,012,233 are disclosed as related art.

SUMMARY

According to an aspect of the embodiments, there is provided a non-transitory computer-readable recording medium storing an information management program for causing a computer to execute processing including: receiving distribution information obtained by attaching, to distribution content to be distributed by a user, attribute information on the user that includes signature information that is signed by an issuing authority that issues information regarding an attribute of the user and that proves that the issuing authority has issued the attribute information; verifying whether the attribute information on the user included in the distribution information is the attribute information issued by the issuing authority, by using the signature information; and outputting the distribution content, based on a verification result.

The object and advantages of the invention will be realized and attained by means of the elements and combinations particularly pointed out in the claims.

It is to be understood that both the foregoing general description and the following detailed description are exemplary and explanatory and are not restrictive of the invention.

2

BRIEF DESCRIPTION OF DRAWINGS

FIG. 1 is a diagram explaining an overall configuration example of an information sharing system according to a first embodiment;

FIG. 3 is a diagram explaining processing of the information sharing system according to the first embodiment;

FIG. 4 is a functional block diagram illustrating a functional configuration of the information sharing system according to the first embodiment;

FIG. 6 is a diagram explaining an example of an information sharing service used by a posting device;

FIG. 14 is a diagram explaining processing of a service providing device according to the second embodiment;

DESCRIPTION OF EMBODIMENTS

Figure 2:
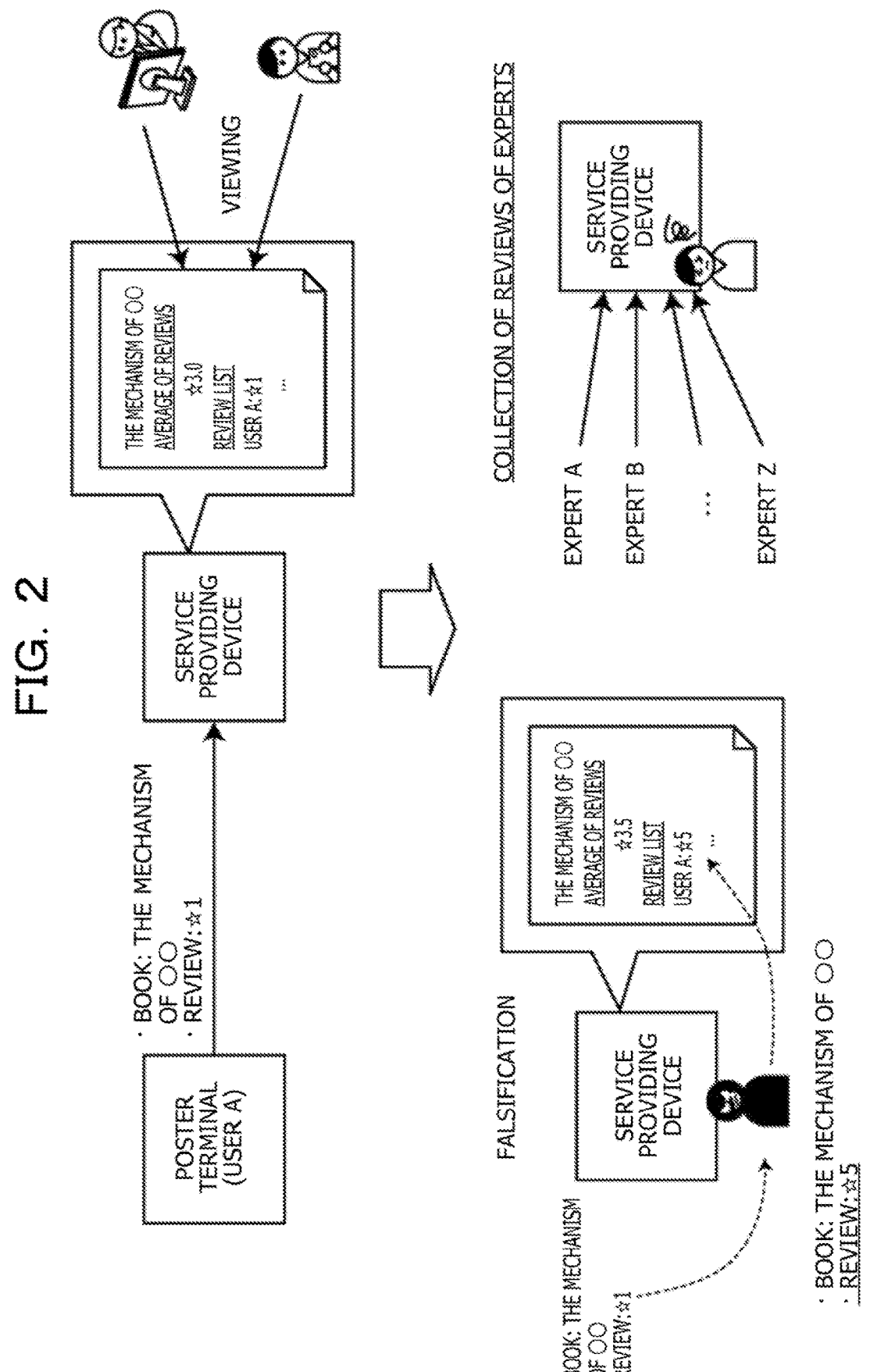
FIG. 2 is a diagram explaining a reference technique.

However, words of mouth and reviews posted on the posting type information sharing services include many unidentified posts, and it is difficult to grasp high-quality words of mouth and reviews. Recently, a service that gathers high-quality reviews and the like by asking an expert chosen at a company side that provides the information sharing service to post a review and the like is also utilized. However, collecting and verifying experts takes time and cost, and thus it is not efficient and is unlikely to be deemed as an effective approach.

In one aspect, an object is to provide an information management program, an information management method, an information processing device, and an information sharing system capable of collecting high-quality published information.

Hereinafter, embodiments of an information management program, an information management method, an information processing device, and an information sharing system disclosed in the present application will be described in detail with reference to the drawings. Note that the present embodiments are not limited to the following embodiments. In addition, the embodiments can be appropriately combined with each other unless otherwise contradicted.

First Embodiment

<Overall Configuration>

Figure 1:
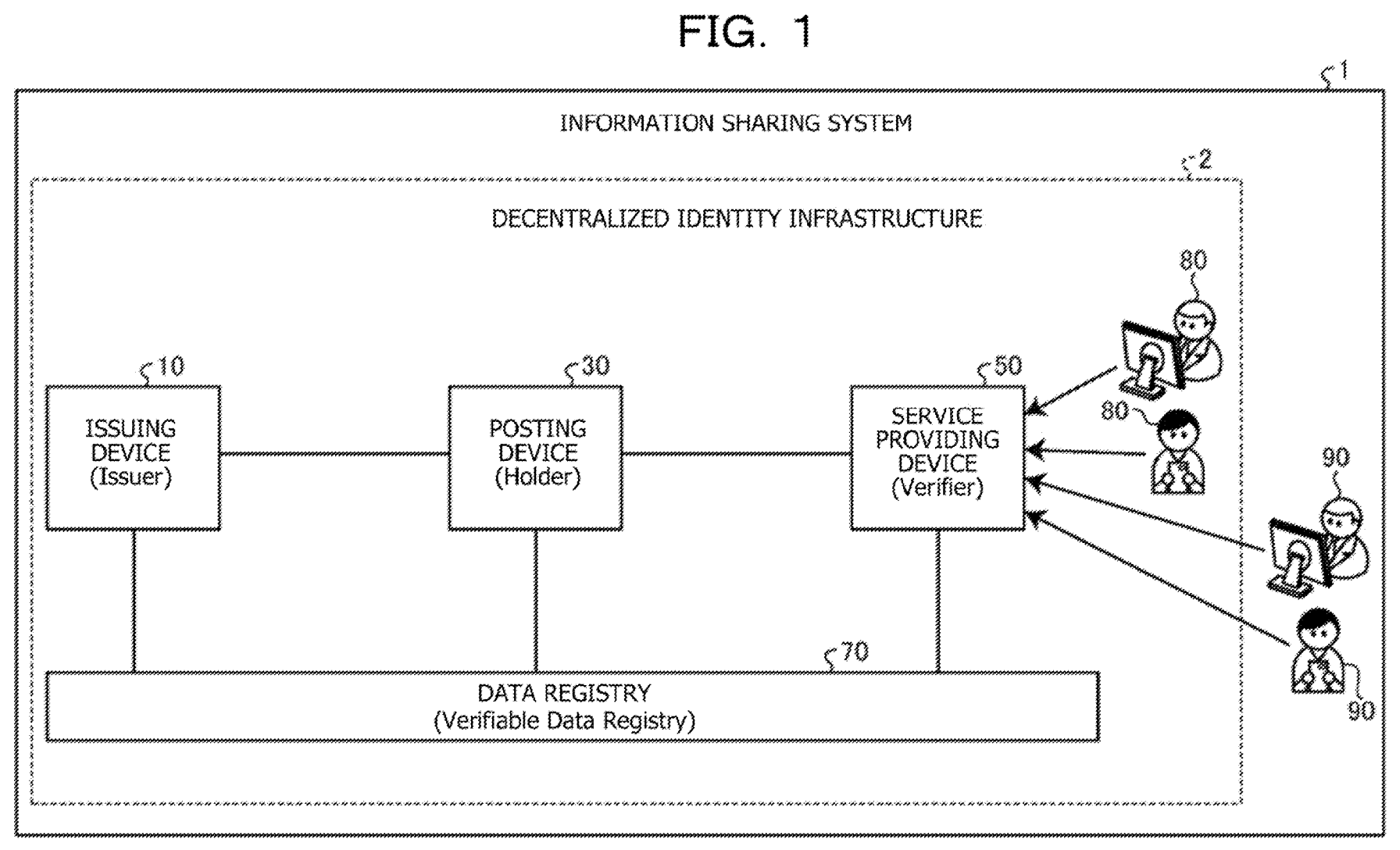

FIG. 1 is a diagram explaining an overall configuration example of an information sharing system according to a first embodiment. An information sharing system 1 illustrated in FIG. 1 is an example of a system for performing review posting for a product in an EC site or the like. Note that, in the present embodiment, as an example of the information sharing service, review posting in an EC site will be described as an example, but the information sharing service is not limited to this. For example, the information sharing service can be applied to a variety of cases of information publishing to the Internet, such as posting to a social networking service (SNS), posting of a comment or "like" to an information site, and announcement of call requirements of crowdfunding.

This information sharing system 1 includes an issuing device 10, a posting device 30, a service providing device 50, a data registry 70, a user terminal 80, and a user terminal 90. In addition, the devices are coupled to each other via a network such as the Internet or a dedicated line regardless of being wired or wireless.

In addition, the issuing device 10, the posting device 30, the service providing device 50, the data registry 70, and the user terminal 80 are computers with a decentralized identity infrastructure (decentralized identity framework) 2 as a platform. Accordingly, the issuing device 10, the posting device 30, the service providing device 50, the data registry 70, and the user terminal 80 recognize each other using a decentralized identifier (DID: decentralized identity). Note that the user terminal 90 is a computer that uses another platform that is not the decentralized identity infrastructure and accesses the service providing device 50 using the Internet or the like.

The issuing device 10 is an example of a computer that issues "verifiable credentials (VC)" to a poster as verifiable attribute information including attribute information such as credential information that the poster has. This issuing device 10 functions as a so-called "Issuer". Note that "Issuer" is an entity that issues the attribute information on Holder.

The posting device 30 is an example of a computer used by a poster who posts "review (evaluation)" for a purchased product or an EC site provided by the service providing device 50 in regard to products purchased on the EC site. This posting device 30 functions as a so-called "Holder". Note that "Holder" is an entity that manages the attribute information issued from Issuer.

The service providing device 50 is an example of a computer device that provides each user with an EC site and manages sales of a product, reviews about a product and a seller, and a review about an operator who operates the EC site. This service providing device 50 functions as a so-called "Verifier". Note that "Verifier" is an entity that verifies the validity of the attribute information presented by Holder.

The data registry 70 is a mechanism or the like that is managed by a platformer that provides the DID infrastructure and that secures the reliability of data exchanged in each device that uses a DID infrastructure 2 and for example, uses a blockchain as an implementation infrastructure. For example, the data registry 70 manages an identifier such as the DID of each device that uses the DID infrastructure 2, public key information on each device, and the like. This data registry 70 functions as a so-called "verifiable Data Registry".

(Reference Technique)

Here, a reference technique of an information sharing service such as a review site provided on the Internet or the like will be described. FIG. 2 is a diagram explaining the reference technique. As illustrated in FIG. 2, in a usual information sharing service, a user A accesses a service providing device using a poster terminal and posts a review "evaluation 1.0" for a book "The mechanism of ○○" purchased on an EC site provided by the service providing device. Note that the evaluation is, for example, five-grade evaluation where "1.0" is the lowest evaluation, and "5.0" is the highest evaluation. In the present embodiment, the evaluation is represented by a star mark in the drawings.

In this manner, by accepting the product review from the purchaser of the product and disclosing the product review, the service providing device uses the product review for advertisement and the like of the product. Meanwhile, by viewing the review of the purchaser when purchasing the product, the user uses the review as a criterion for determining whether or not to purchase the product.

In other words, the review on the EC site is the opinion of the user for the product without any biased judgment, the impression of the product that has been purchased, and the like and is very useful information. Therefore, when the credibility of the review decreases, not only the reliability of the product decreases, but also the degree of reliability of the operator who operates the EC site decreases. For this reason, it is important to grasp high-quality words of mouth and reviews.

However, in the reference technique, it is difficult to confirm the credibility of the review and to grasp high-quality reviews. For example, in the reference technique, there is a possibility that the operator of the service providing device that provides the EC site falsifies a low review to a high review. In addition, it is also conceivable that the operator of the service providing device gathers high-quality reviews and the like by asking an expert to post a review and the like, but this is unlikely to be deemed as an effective approach since a wide variety of procedures will be involved to obtain high-quality reviews, such as selection of an expert, offer to the expert, and verification of a review of the expert.

(Description of Processing According to First Embodiment)

Thus, in the first embodiment, a technique will be disclosed in which an information sharing service collects high-quality reviews by verifying posted information that guarantees the identity of a poster and then permits words of mouth and reviews from only posters meeting conditions.

Figure 3:
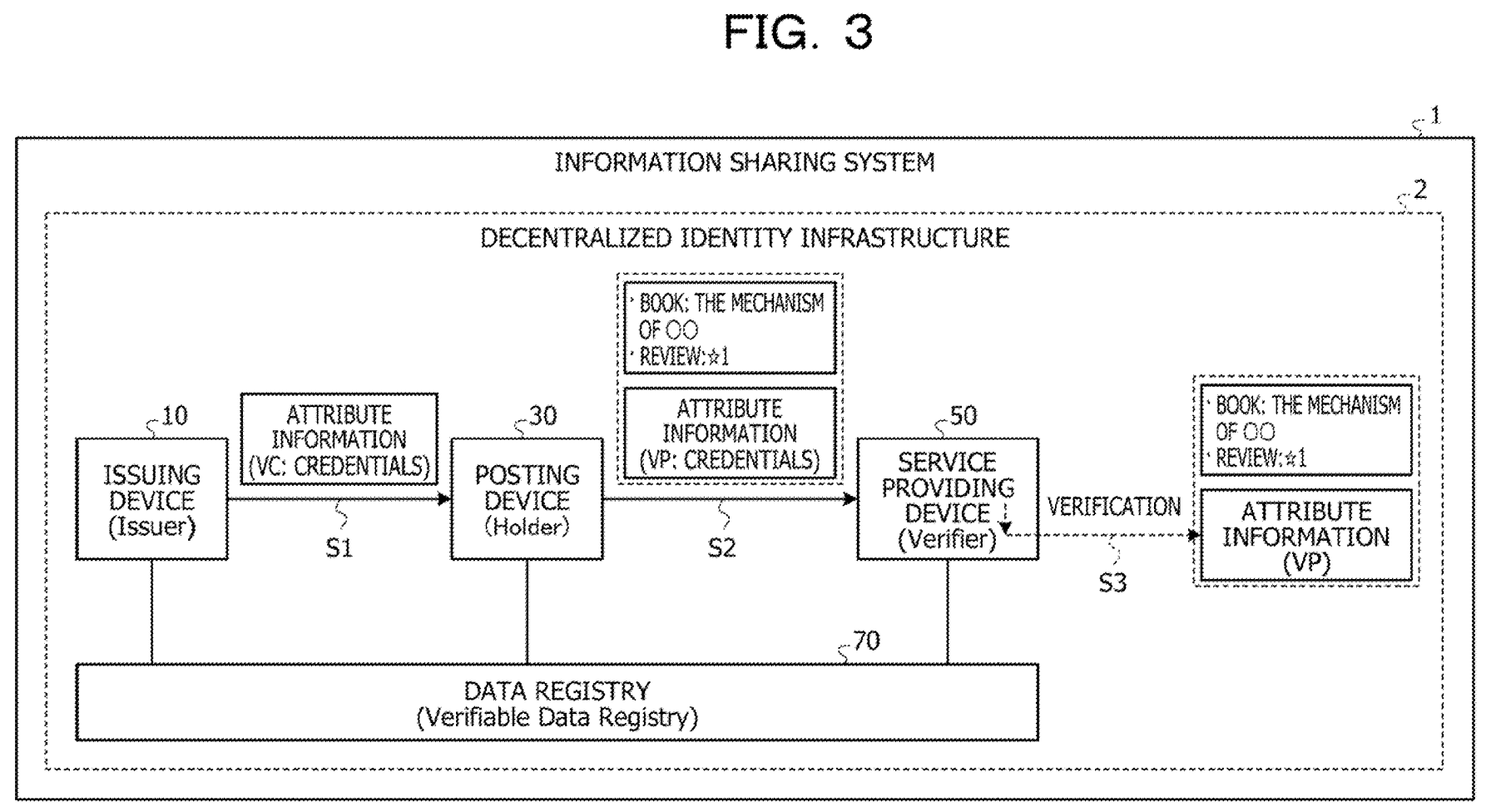

FIG. 3 is a diagram explaining processing of the information sharing system according to the first embodiment. As illustrated in FIG. 3, the issuing device 10 that is "Issuer" issues "VC" to the posting device 30 as attribute information including credential information on a poster who uses the posting device 30, and signature information proving that the issuing device 10 has issued the credential information and is signed by the issuing device 10 (S1). Note that the issuing device 10 stores information for verifying the signature included in the attribute information, in the data registry 70.

For example, when the review is intended for a "book relating to encryption", the credential information has information indicating whether or not a credential related to information security has been acquired, and for example, when the review is intended for "food", the credential information has information indicating whether or not a credential such as a dietitian has been acquired. In other words, the credential information refers to information indicating the presence or absence of a credential useful for the object intended by the review.

Subsequently, when posting the review to the service providing device 50, the posting device 30 posts the posted information obtained by attaching the attribute information to the posted content to be posted (S2). For example, the posting device 30 transmits the posted content "book: The mechanism of ○○, review: evaluation 1.0" and "verifiable presentation (VP)", which is posted information generated from the VC "signature information and credential information", to the service providing device 50.

Thereafter, the service providing device 50 verifies whether or not the attribute information included in the received posted information is the attribute information issued by the issuing device 10 and manages the posted information based on the verification result (S3). For example, the service providing device 50 acquires a public key associated with the DID identifier included in the VP, from the data registry 70, and determines whether or not the credential information included in the VP is valid information, by verifying the signature information in the VP. Then, the service providing device 50, for example, aggregates reviews of only valid credential holding persons or provides those reviews to other users.

In this manner, the information sharing system 1 according to the first embodiment can extract valid posted information by extracting each VP from a plurality of pieces of posted information posted randomly and verifying each VP. Therefore, the information sharing system 1 may collect high-quality reviews.

<Functional Configuration>

Figure 4:
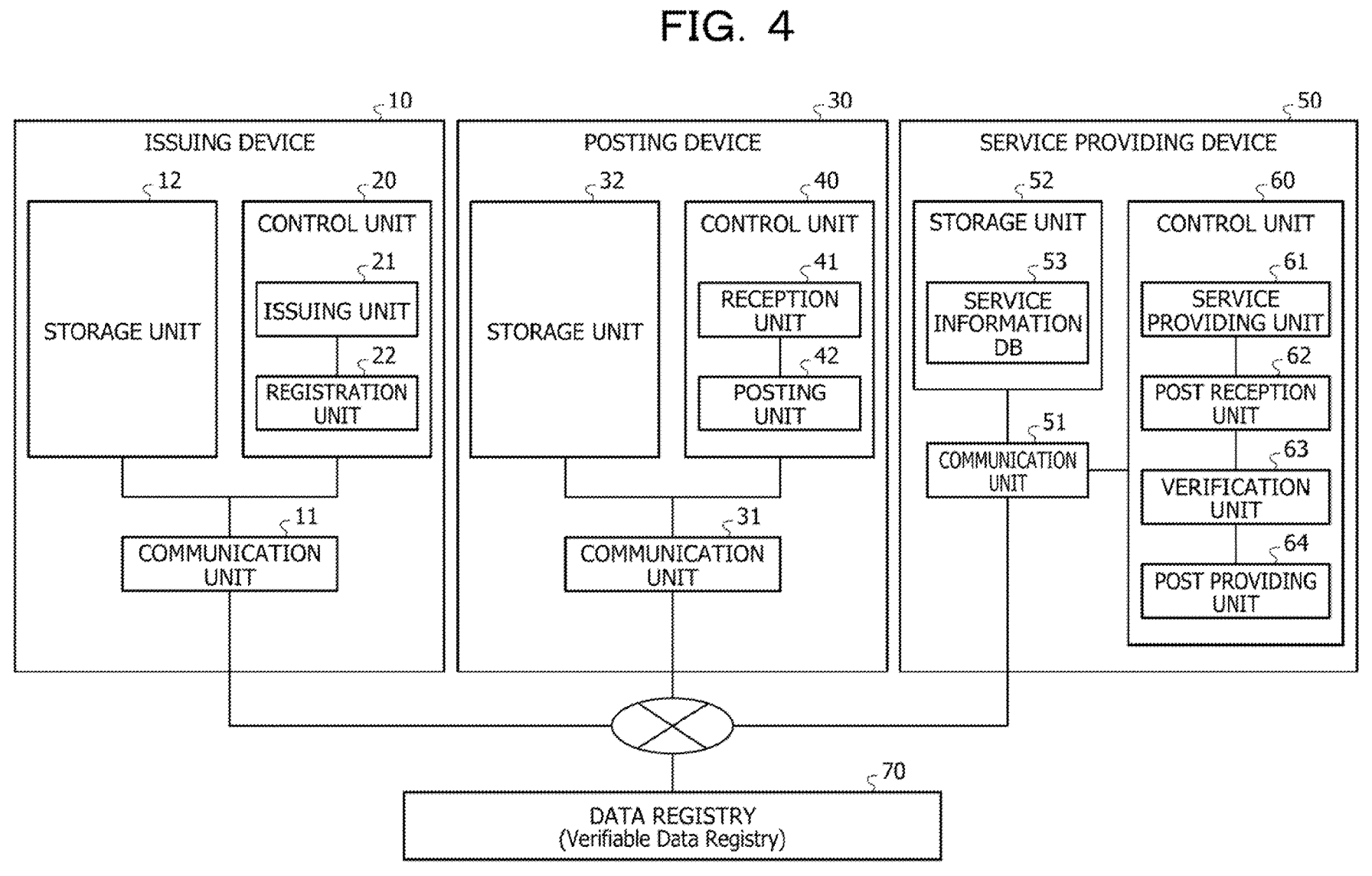

FIG. 4 is a functional block diagram illustrating a functional configuration of the information sharing system 1 according to the first embodiment. Here, each of the issuing device 10, the posting device 30, and the service providing device 50 will be described.

(Functional Configuration of Issuing Device 10)

As illustrated in FIG. 4, the issuing device 10 includes a communication unit 11, a storage unit 12, and a control unit 20. The communication unit 11 is a processing unit that controls communication with another device and is implemented by, for example, a communication interface. For example, the communication unit 11 executes transmission and reception of various types of data with the data registry 70 and transmission and reception of various types of data with the posting device 30.

The storage unit 12 is a processing unit that stores various types of data, programs to be executed by the control unit 20, and the like and, for example, is implemented by a memory, a processor, and the like. For example, the storage unit 12 stores the DID identifier that identifies the issuing device 10, the DID identifier of each device, information regarding a private key of an issuing party who uses the issuing device 10, various types of information used in the DID infrastructure, and the like.

The control unit 20 is a processing unit that takes overall control of the issuing device 10 and, for example, is implemented by a processor or the like. This control unit 20 includes an issuing unit 21 and a registration unit 22. Note that the issuing unit 21 and the registration unit 22 are implemented by, for example, an electronic circuit included in the processor or a process executed by the processor.

The issuing unit 21 is a processing unit that issues the attribute information on the user (poster) of the posting device 30, to the posting device 30. For example, in response to a request from the user (poster) of the posting device 30, the issuing unit 21 issues, to the posting device 30, "VC"

including the credential information acquired by the user and the signature information proving the credential information and indicating that the issuing device 10 has issued the credential information.

Figure 5:
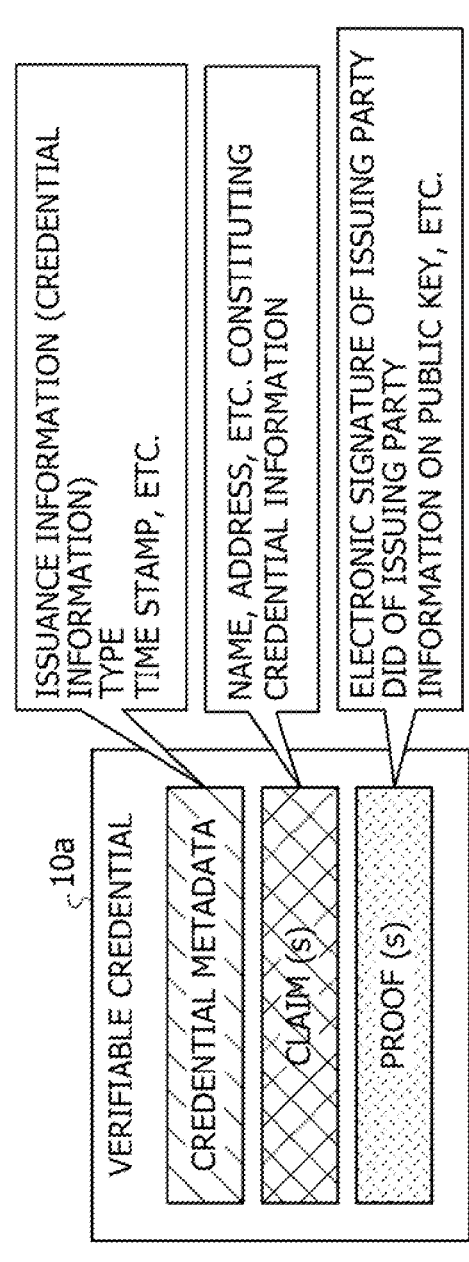
FIG. 5 is a diagram explaining an example of attribute information issued by an issuing device.

FIG. 5 is a diagram explaining an example of the attribute information issued by the issuing device 10. As illustrated in FIG. 5, a VC 10*a* issued by the issuing device 10 includes "Credential Metadata", "Claim", and "Proof". "Credential Metadata" is metadata relating to the credential information to be issued and is set with, for example, the name and the type of the credential information, the time stamp of issuance, the issuing party, and the like. "Claim" is information regarding the credential information and is set with, for example, the name, the address, and the like constituting the credential information. "Proof" is information regarding an electronic signature used by the issuing party to sign and, for example, includes the signature standard, the DID of the signer, and the like.

To give an example, the name, the acquisition year, and the like of the information security credential that has already been acquired are set in "Credential Metadata". In "Claim", the name of the acquirer "Tokkyo Taro", and the like are set. In "Proof", an electronic signature obtained by signing with a private key of the issuing party who has issued the information security credential, and the like are set.

Note that the number of pieces of the credential information registered in the VC is not restricted to one. For example, when the poster owns a plurality of credentials, the issuing device 10 can register a plurality of pieces of credential information in "Credential Metadata" or the like.

The registration unit 22 is a processing unit that registers information regarding the attribute information (VC) issued by the issuing unit 21, in the data registry 70. For example, the registration unit 22 registers information for verifying the signature included in the attribute information, such as a public key, in the data registry 70.

(Functional Configuration of Posting Device 30)

As illustrated in FIG. 4, the posting device 30 includes a communication unit 31, a storage unit 32, and a control unit 40. The communication unit 31 is a processing unit that controls communication with another device and is implemented by, for example, a communication interface. For example, the communication unit 31 executes transmission and reception of various types of data with the data registry 70, transmission and reception of various types of data with the issuing device 10, and transmission and reception of various types of data with the service providing device 50.

The storage unit 32 is a processing unit that stores various types of data, programs to be executed by the control unit 40, and the like and, for example, is implemented by a memory, a processor, and the like. For example, the storage unit 32 stores the DID identifier that identifies the posting device 30, the DID identifier of each device, information regarding a private key of a poster who uses the posting device 30, various types of information used in the DID infrastructure, and the like.

The control unit 40 is a processing unit that takes overall control of the posting device 30 and, for example, is implemented by a processor or the like. This control unit 40 includes a reception unit 41 and a posting unit 42. Note that the reception unit 41 and the posting unit 42 are implemented by, for example, an electronic circuit included in the processor or a process executed by the processor.

The reception unit 41 is a processing unit that receives the attribute information from the issuing device 10. For example, the reception unit 41 receives the VC that is the attribute information issued by the issuing device 10 in response to a request from the poster and includes the credential information regarding a credential owned by the poster, the electronic signature proving issuance by the issuing device 10, and the like. Then, the reception unit 41 stores the received VC in the storage unit 32.

The posting unit 42 is a processing unit that posts a review to an EC site or the like provided by the service providing device 50. Here, an EC site used by the user terminals including the posting device 30 will be described.

FIG. 6 is a diagram explaining an example of an information sharing service used by the posting device 30. As illustrated in FIG. 6, the posting device 30 that is an example of the user terminal accesses the service providing device 50 by web and displays a book sales site 50*a*. Then, the user terminal (posting device 30) of a viewer who is considering the purchase of the book can view a review list 50*b* posted for the book "The mechanism of ○○" by selecting the book "The mechanism of ○○". As a result, the user can confirm the average of the reviews for the book and the review content as criteria for determining whether or not to purchase the book.

Meanwhile, the posting device 30 that is an example of the user terminal that performs the review for the purchased book displays a posting screen 50*c* on which the review from the posting device 30 for the book "The mechanism of ○○" is posted, by selecting a "review registration button" or the like for the book "The mechanism of ○○". Then, the user terminal (posting device 30) inputs the evaluation content and the reason for the evaluation and presses a "post button" or the like, thereby transmitting the posted information (review) from the user terminal (posting device 30) to the service providing device 50.

At this time, the user terminal (posting device 30) transmits the posted information generated from the VC to the service providing device 50. Specifically, the posting device 30 transmits, to the service providing device 50, posted information obtained by attaching "VP" generated from "VC" that defines a certificate issued by the issuing device 10 (Issuer) for the posting device 30 (Holder), to the review content from the posting device 30.

Figure 7:
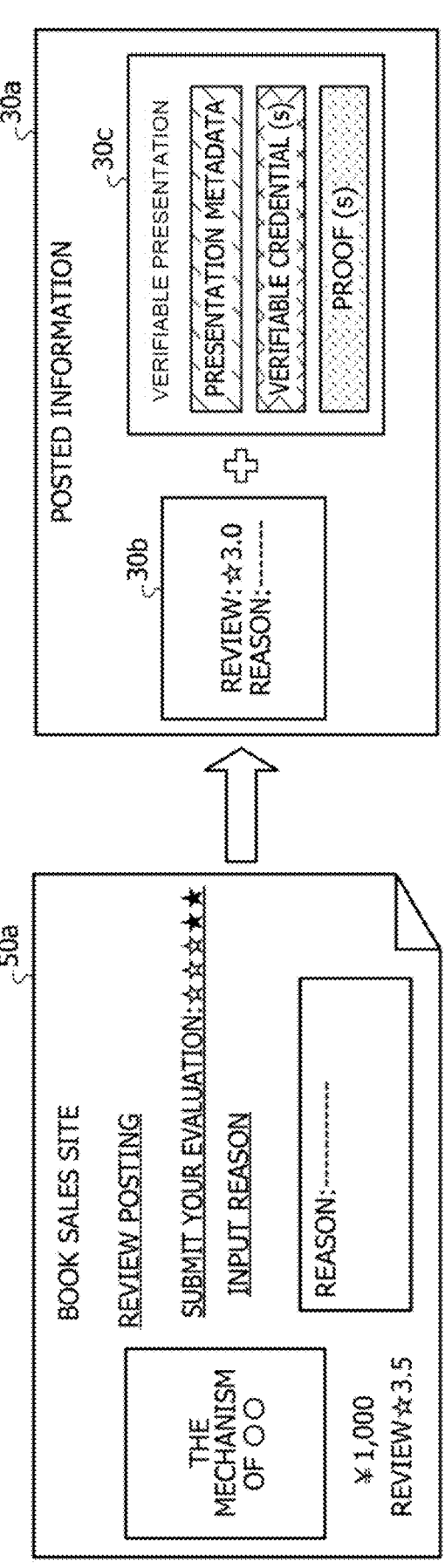
FIG. 7 is a diagram explaining an example of posted information posted by the posting device.

FIG. 7 is a diagram explaining an example of the posted information posted by the posting device 30. For example, as illustrated in FIG. 7, the posting unit 42 of the posting device 30 transmits posted information 30*a* generated from review information 30*b* and a VP 30*c* to the service providing device 50. The review information 30*b* includes the review "evaluation 3.0" for the book "The mechanism of ○○" and the reason. The VP 30*c* includes "Presentation Metadata", "Verifiable Credentials", and "Proof".

"Presentation Metadata" is metadata as Presentation and, for example, is set with the name of Presentation, the name of contained Verifiable Credentials, use conditions, and the like. "Verifiable Credentials" are a subset of a plurality of Verifiable Credentials and, for example, are set with the VC illustrated in FIG. 5, which has been issued from the issuing device 10. "Proof" is information regarding an electronic signature used by Holder to sign and, for example, includes the DID of the posting device 30, and the like.

(Functional Configuration of Service Providing Device 50)

As illustrated in FIG. 4, the service providing device 50 includes a communication unit 51, a storage unit 52, and a control unit 60. The communication unit 51 is a processing unit that controls communication with another device and is implemented by, for example, a communication interface. For example, the communication unit 51 executes transmission and reception of various types of data with the data registry 70, transmission and reception of various types of data with the posting device 30, and transmission and reception of various types of data with the user terminal 80 and the user terminal 90.

The storage unit 52 is a processing unit that stores various types of data, programs to be executed by the control unit 60, and the like and, for example, is implemented by a memory, a processor, and the like. For example, the storage unit 52 stores the DID identifier that identifies the service providing device 50, the DID identifier of each device, various types of information used in the DID infrastructure, and the like.

In addition, the storage unit 52 stores a service information database (DB) 53. The service information DB 53 is a database that stores information regarding a service such as the EC site provided by the service providing device 50. For example, the service information DB 53 stores information regarding each product sold on a website, information regarding a review posted for each product, and information regarding a user who is allowed to use the website.

The control unit 60 is a processing unit that takes overall control of the service providing device 50 and, for example, is implemented by a processor or the like. This control unit 60 includes a service providing unit 61, a post reception unit 62, a verification unit 63, and a post providing unit 64. Note that the service providing unit 61, the post reception unit 62, the verification unit 63, and the post providing unit 64 are implemented by, for example, an electronic circuit included in the processor or a process executed by the processor.

The service providing unit 61 is a processing unit that provides each user terminal with a web service such as an EC site. For example, the service providing unit 61 outputs, to the user terminal that has accessed, the book sales site 50*a*, the review list 50*b* that displays the review list of each product, the posting screen 50*c* on which a personal review is posted, and the like described with reference to FIG. 6.

The post reception unit 62 is a processing unit that receives the posted information from the posting device 30. For example, the post reception unit 62 receives the posted information input via the posting screen 50*c*. That is, the post reception unit 62 receives the posted information 30*a* generated from the review information 30*b* and the VP 30*c* illustrated in FIG. 7. In addition, the post reception unit 62 stores the received posted information 30*a* in the storage unit 52 and outputs the received posted information 30*a* to the verification unit 63.

The verification unit 63 is a processing unit that verifies, for the posted information 30*a* received by the post reception unit 62, whether or not the attribute information (credential information) on the user included in the posted information 30*a* is the attribute information issued by the issuing device 10, using the signature information included in the posted information 30*a*. That is, the verification unit 63 verifies whether or not the information that has been posted is a useful post from a credential owner, and whether or not the credential information included in the posted information is information issued by a valid authority.

Figure 8:
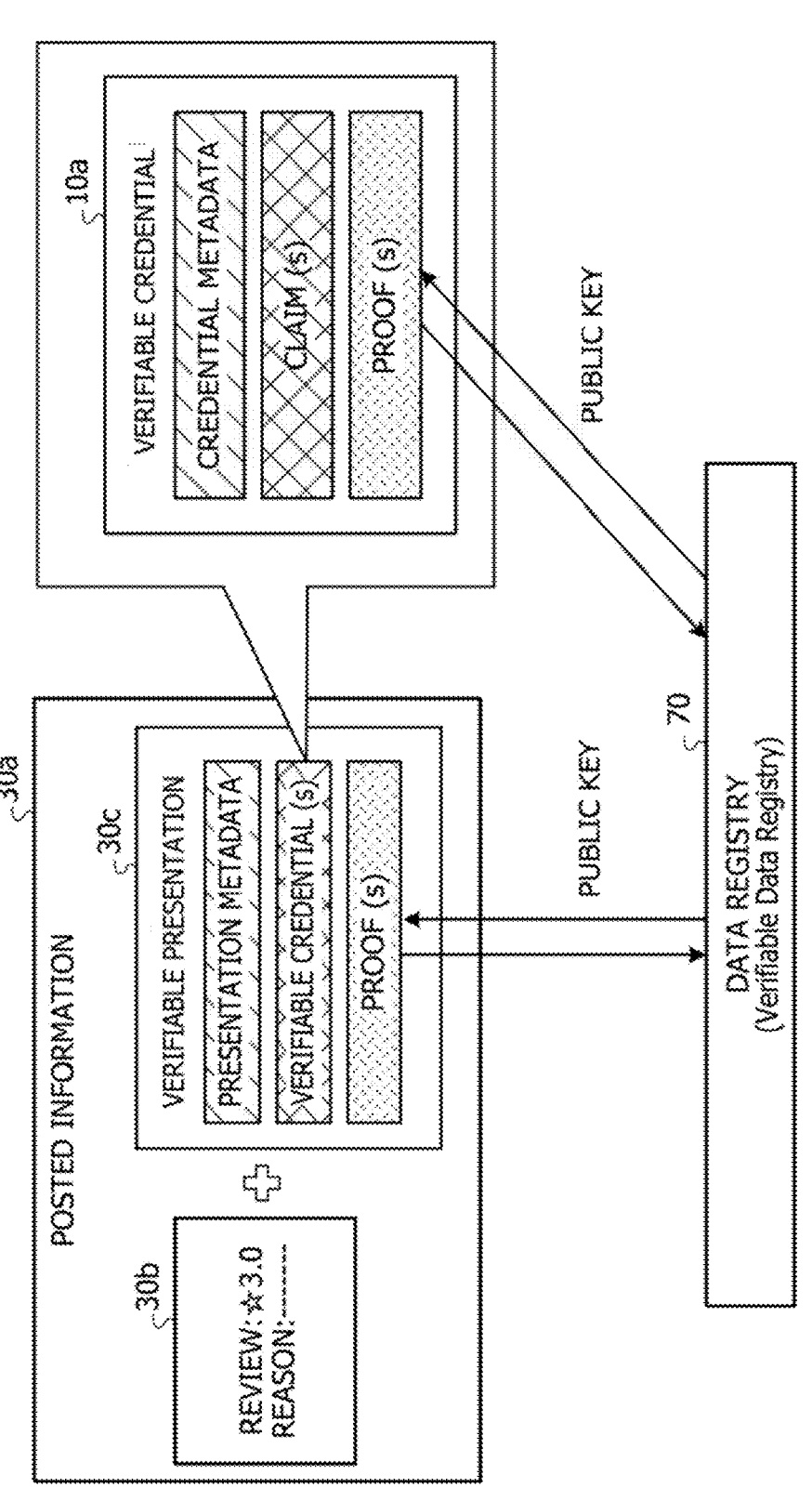
FIG. 8 is a diagram explaining an example of a verification approach by a service providing device.

Here, an example of a verification approach will be described with reference to FIG. 8. FIG. 8 is a diagram explaining an example of a verification approach by the service providing device 50. As illustrated in FIG. 8, when receiving the posted information 30*a* generated from the review information 30*b* and the VP 30*c*, the verification unit 63 acquires, from the data registry 70, the public key corresponding to the DID identifier of the posting device 30 set in Proof within the VP 30*c*. Then, the verification unit 63 verifies whether or not the VP 30*c* is valid information signed by the posting device 30, using the acquired public key.

Subsequently, when verifying the VP 30*c* as valid information, the verification unit 63 refers to Proof within the VC 10*a* set in "Verifiable Credentials" of the VP 30*c* to acquire the public key corresponding to the DID identifier of the issuing device 10 set in Proof, from the data registry 70. Then, the verification unit 63 verifies whether or not the VC 10*c* is valid information signed by the issuing device 10, using the acquired public key.

Then, the verification unit 63 stores the posted information 30*a* and the verification result in the storage unit 52 in association with each other. Note that the verification approach illustrated in FIG. 8 is merely an example, and the verification approach is changed depending on information in Proof set in the VP 30*c*. However, if at least the verification using Proof in the VC 10*a* within the VP 30*c* can be executed, the credential information within the VC 10*a* can be verified. For example, there will be a case where Proof within the VP 30*c* is the signature of Issuer, or a certificate text created by Holder from the signature of Issuer will be sometimes set. In this case, the verification unit 63 executes verification using Proof in the VC 10*a* within the VP 30*c*. Note that the certificate is also called, for example, zero knowledge proof and is an example of proof for proving that, while hiding a part of the content of the certificate, a formal signature of Issuer is given to the content before hiding.

Figure 9:
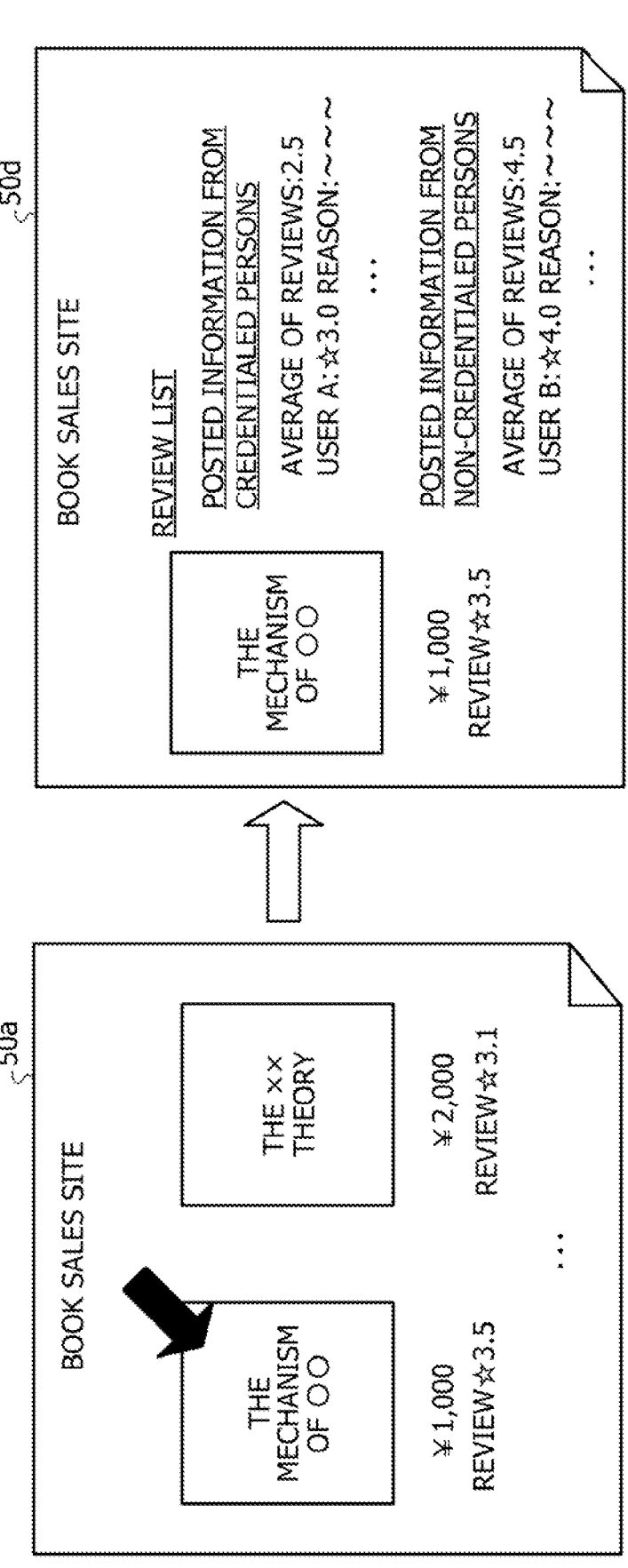
FIG. 9 is a diagram explaining an example of the information sharing service using verification results.
Figure 10:
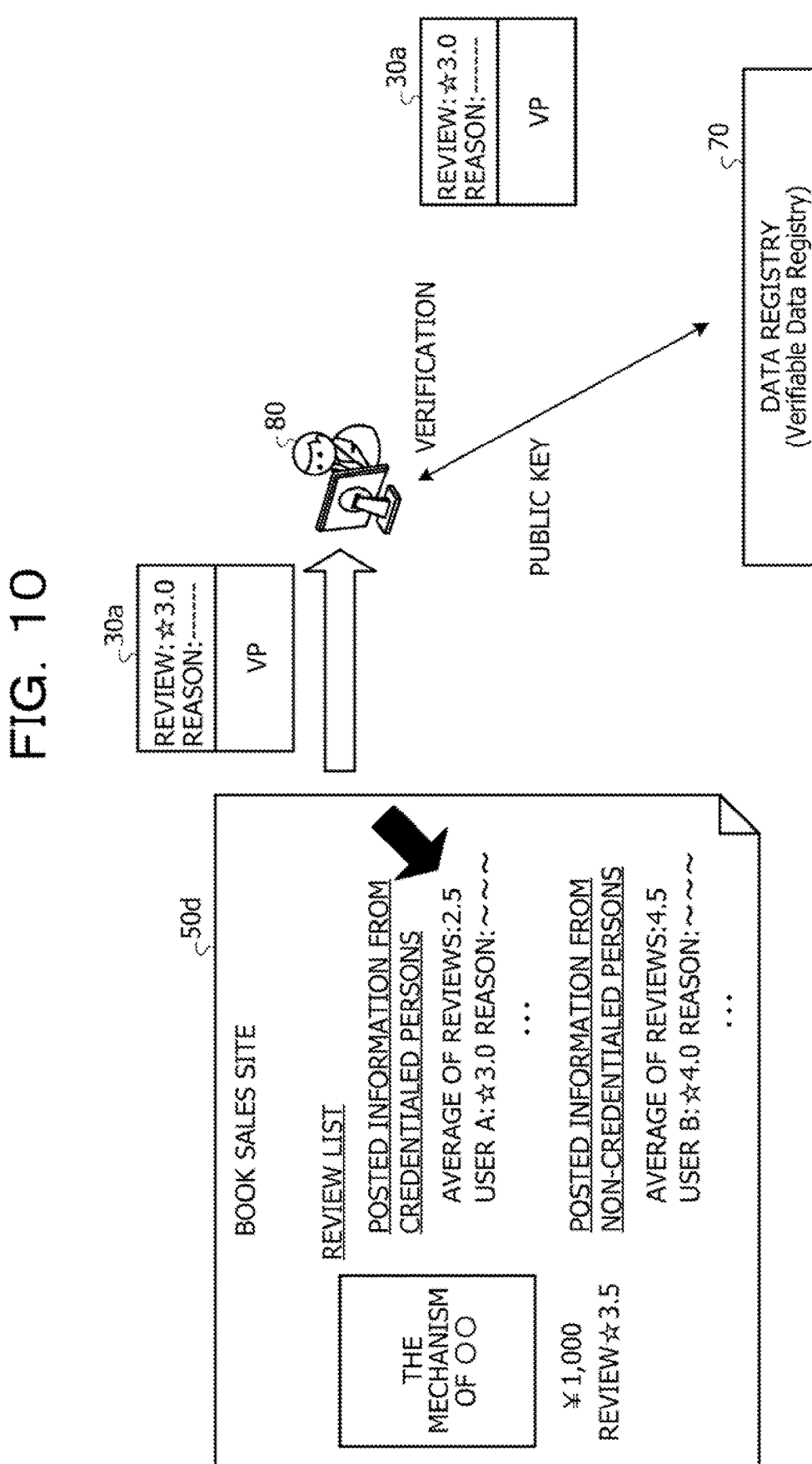
FIG. 10 is a diagram explaining an example of the information sharing service using a verification results.

The post providing unit 64 is a processing unit that manages various types of the posted information 30*a* according to the verification results for the posted information 30*a* and provides the user terminal with various services according to the verification results. FIGS. 9 and 10 are diagrams explaining examples of the information sharing service using the verification results. As illustrated in FIG. 9, when the review list of each product is displayed, the post providing unit 64 provides the user terminal with a list screen 50*d* that classifies between and displays the review list and the average of reviews of credentialed persons and the review list and the average of reviews of non-credentialed persons.

In addition, as illustrated in FIG. 10, the post providing unit 64 displays the list screen 50*d* that classifies between and displays the reviews of the credentialed persons and the reviews of the non-credentialed persons, on the user terminal 80 using the DID infrastructure. Then, when receiving a request for acquiring the review details of the credentialed persons from the user terminal 80, the post providing unit 64 transmits the posted information 30*a* transmitted from the posting device 30 to the user terminal 80. That is, the post providing unit 64 provides the verifiable posted information 30*a* to the user terminal 80 as it is. As a result, the user terminal 80 is allowed to verify the posted information 30*a* by itself.

<Processing Flow>

Figure 11:
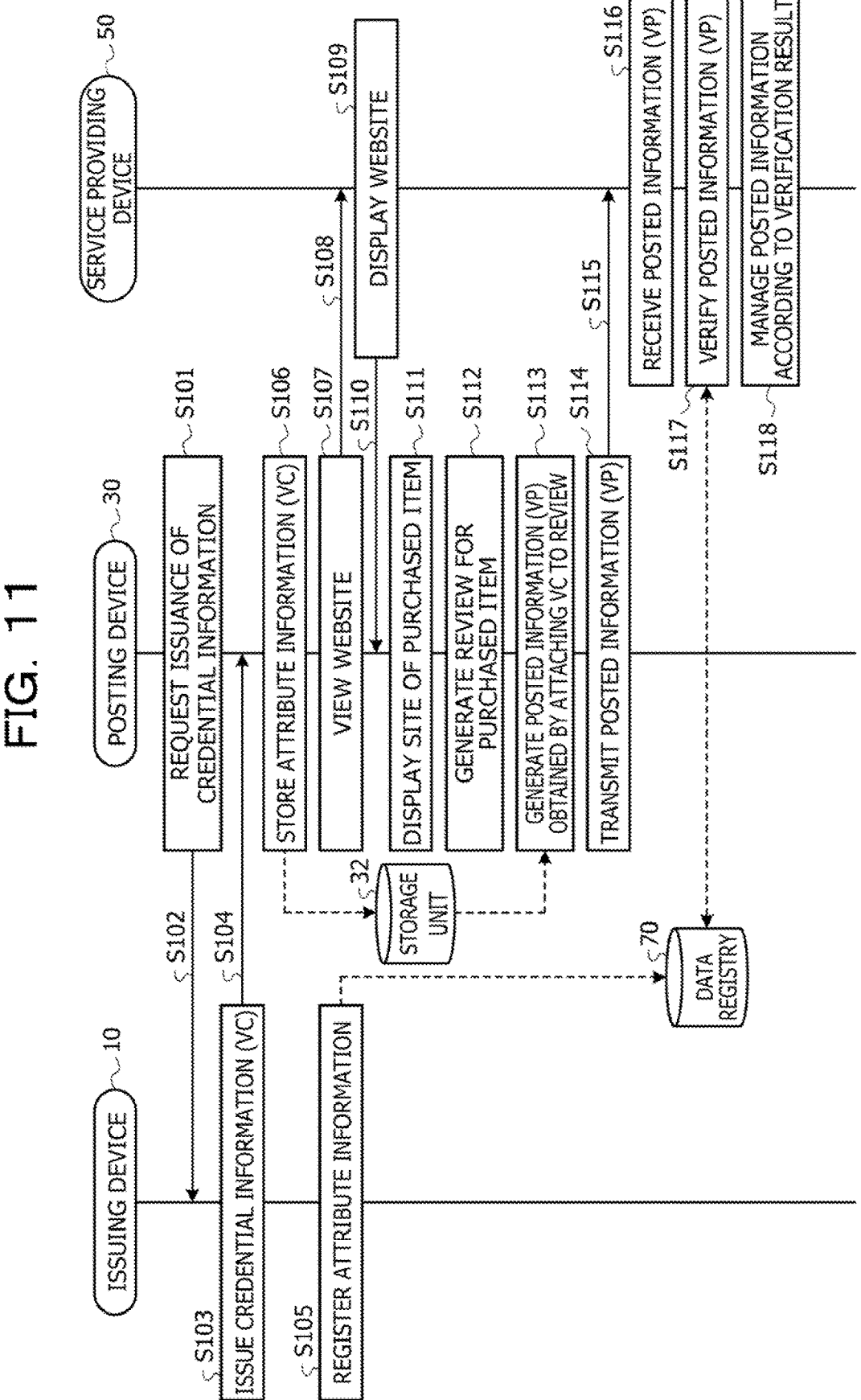
FIG. 11 is a sequence diagram illustrating a posting process executed by the information sharing system according to the first embodiment.

FIG. 11 is a sequence diagram illustrating a posting process executed by the information sharing system according to the first embodiment. As illustrated in FIG. 11, when the posting device 30 transmits a request for issuing the acquired credential information to the issuing device 10 (S101 and S102), the issuing device 10 generates the attribute information "VC" including the credential information and issues the generated attribute information to the posting device 30 (S103 and S104). Note that the issuing device 10 registers information regarding the issued VC, for example, including association between the DID of the issuing party and the public key, and the like, in the data registry 70 (S105).

The posting device 30 stores the VC issued from the issuing device 10 in the storage unit 32 (S106). Then, when the posting device 30 accesses the website provided by the service providing device 50 (S107 and S108), the service providing device 50 outputs and displays the relevant website to and on the posting device 30 (S109 and S110).

Subsequently, the posting device 30 displays the site of the purchased item (S111) and generates a review for the purchased item (S112). Then, the posting device 30 reads the VC stored in the storage unit 32, generates the posted information obtained by attaching the VP generated from the VC to the generated review (S113), and transmits the generated posted information (review+VP) to the service providing device 50 (S114 and S115).

Then, the service providing device 50 receives the posted information from the posting device 30 (S116) and verifies the posted information, using the public key of the issuing device 10 or the like registered in the data registry 70 (S117). Thereafter, the service providing device 50 manages the posted information according to the verification result (S118).

Effects

As described above, the service providing device 50 not only may specify whether or not the review posted from the posting device 30 is a review of a credentialed person, but also may determine whether or not the credential information for the review is credential information issued by a valid issuing party. The service providing device 50 may accurately and efficiently accumulate highly reliable high-quality reviews posted by experts or the like. In addition, since the service providing device 50 can directly collect the review from a valid credentialed person, the likelihood of falsification of the review may also be reduced. Therefore, the service providing device 50 may provide a high-value information sharing service to the user.

In addition, since the information sharing system 1 according to the first embodiment can apply the above approach of the first embodiment to the DID infrastructure that has already been constructed, the cost and risk incurred for system introduction may be reduced. Therefore, the information sharing system 1 according to the first embodiment may convert the whole of the widely used EC site using the web into a safe and highly reliable service.

Second Embodiment

Incidentally, the information sharing system 1 illustrated in the first embodiment can execute further security enhancement such as suppression of review falsification, as compared with the approach according to the first embodiment. For example, the information sharing system 1 allows the issuing party to confirm the review that guarantees the identity with the VP confirmed by the service providing device 50, thereby suppressing fraud such as diversion of the VP of the poster to a word of mouth or a review different from the original post.

Thus, in a second embodiment, a process in which a poster posts a review and the VP to an information sharing service in an anti-falsification format in which the review and the VP are linked with each other to enhance security will be described. Note that, since a system configuration according to the second embodiment is similar to the system configuration of the first embodiment, a detailed description thereof will be omitted.

Figure 12:
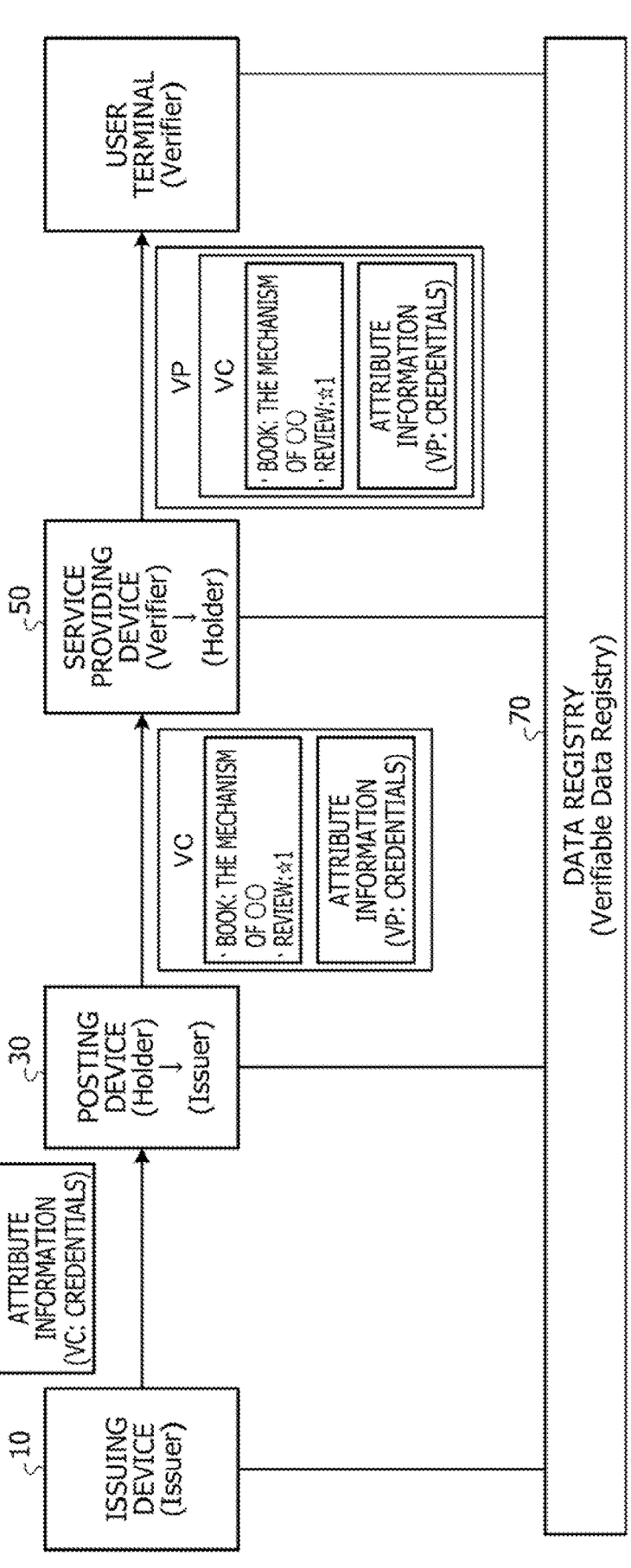
FIG. 12 is a diagram explaining processing of an information sharing system according to a second embodiment.

FIG. 12 is a diagram explaining processing of an information sharing system 1 according to the second embodiment. As illustrated in FIG. 12, an issuing device 10 functions as Issuer to issue the attribute information "VC" including the credential information on the poster of a posting device 30, to the posting device 30 that is Holder.

In an approach similar to the approach of the first embodiment, the posting device 30 that has received "VC" as Holder generates a review and generates the posted information in which the review and the VP are associated with each other. Here, the posting device 30 functions as Issuer instead of Holder to generate the VC in which its own VP and review are embedded and transmits the generated VC to a service providing device 50 as Holder.

Subsequently, the service providing device 50 that has received "VC" as Holder functions as Verifier and verifies the VC and the VP. That is, the service providing device 50 acquires each public key from a data registry 70 and verifies the review and the credential information, by verifying the received VC and the VP and the like within the VC.

Furthermore, the service providing device 50 functions as Holder when receiving a request for verifying the posted information from a user terminal 80 as Verifier. That is, the service providing device 50 generates the verifiable VP using the VC received from the posting device 30 and transmits the generated VP to the user terminal 80 as Verifier.

As a result, the user terminal 80 is allowed to verify the VP. Therefore, the information sharing system 1 according to the second embodiment may restrain fraud in the information sharing service, using only the mechanism of the DID infrastructure.

Figure 13:
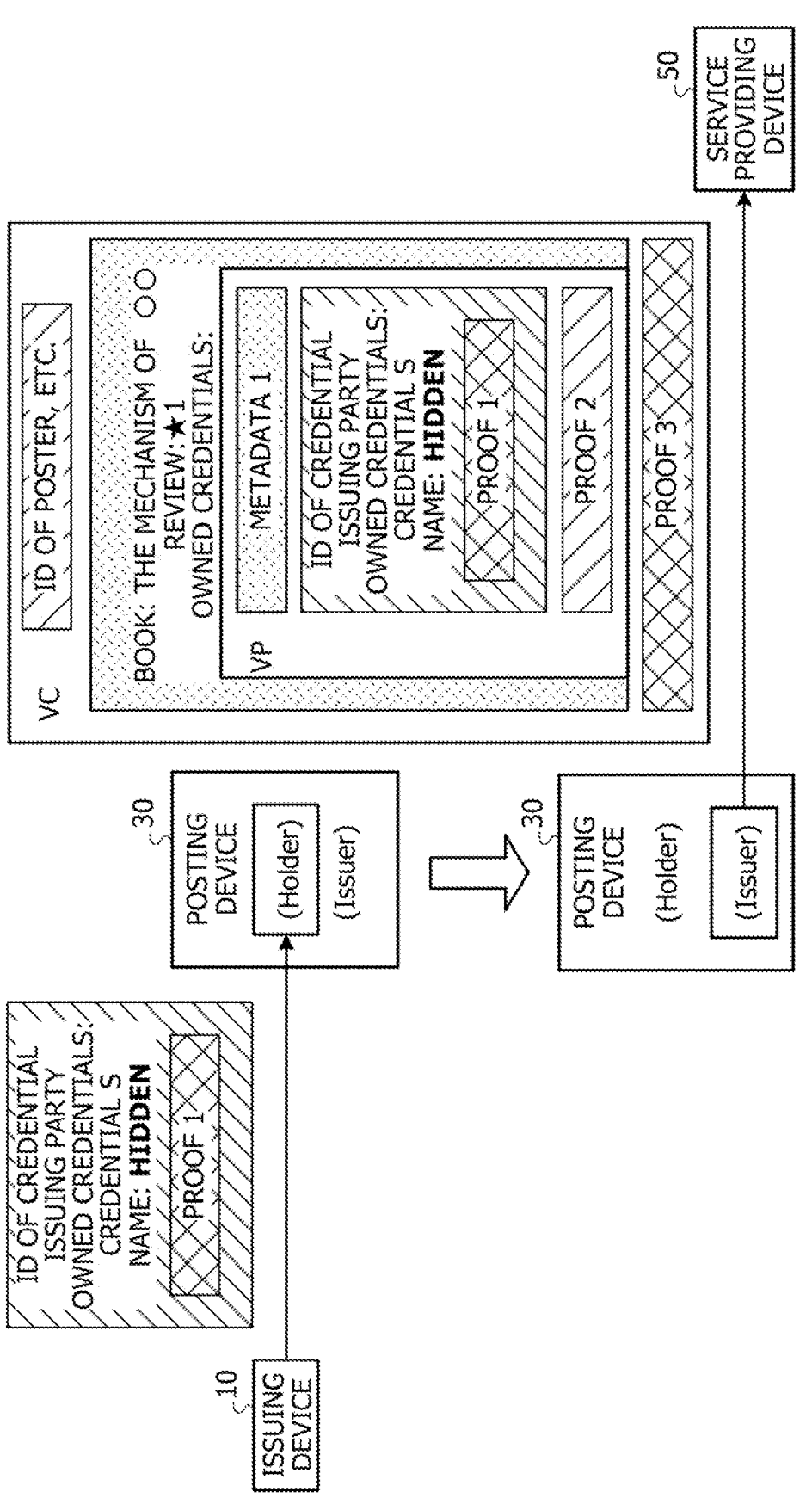
FIG. 13 is a diagram explaining processing of a posting device according to the second embodiment.

Here, a specific example of the processing according to the second embodiment will be described with reference to FIGS. 13 and 14. FIG. 13 is a diagram explaining processing of the posting device 30 according to the second embodiment, and FIG. 14 is a diagram explaining processing of the service providing device 50 according to the second embodiment.

As illustrated in FIG. 13, the issuing device 10 issues "VC" including the credential information as "Issuer" to the posting device 30 that is "Holder", by an approach similar to the approach of the first embodiment. For example, the issuing device 10 issues "VC" including the ID of the credential issuing party, the owned credentials (credential S), the hidden name of the credential owner, and an electronic signature (Proof 1) used by the issuing device 10 to sign.

The posting device 30 that has received "VC" as "Holder" serves as Issuer to embed its own "VP" into "VC" and issues new "VC" by assuming the service providing device 50 as "Holder". For example, the posting device 30 attaches "VP" that is owned credential information, to the review content (Book: The mechanism of ∞, review: evaluation 1.0), and also issues "VC" including the ID of the poster and an electronic signature (Proof 3) used by the posting device 30 as "Issuer" to sign. "VP" includes "VC" received from the issuing device 10, an electronic signature (Proof 2) used by the posting device 30 as "Holder" to sign, and metadata 1 relevant to "Presentation Metadata". Note that "Proof 2" is not restricted to the electronic signature used by the posting device 30 to sign and may be the above-mentioned zero knowledge proof or the like.

Figure 14:
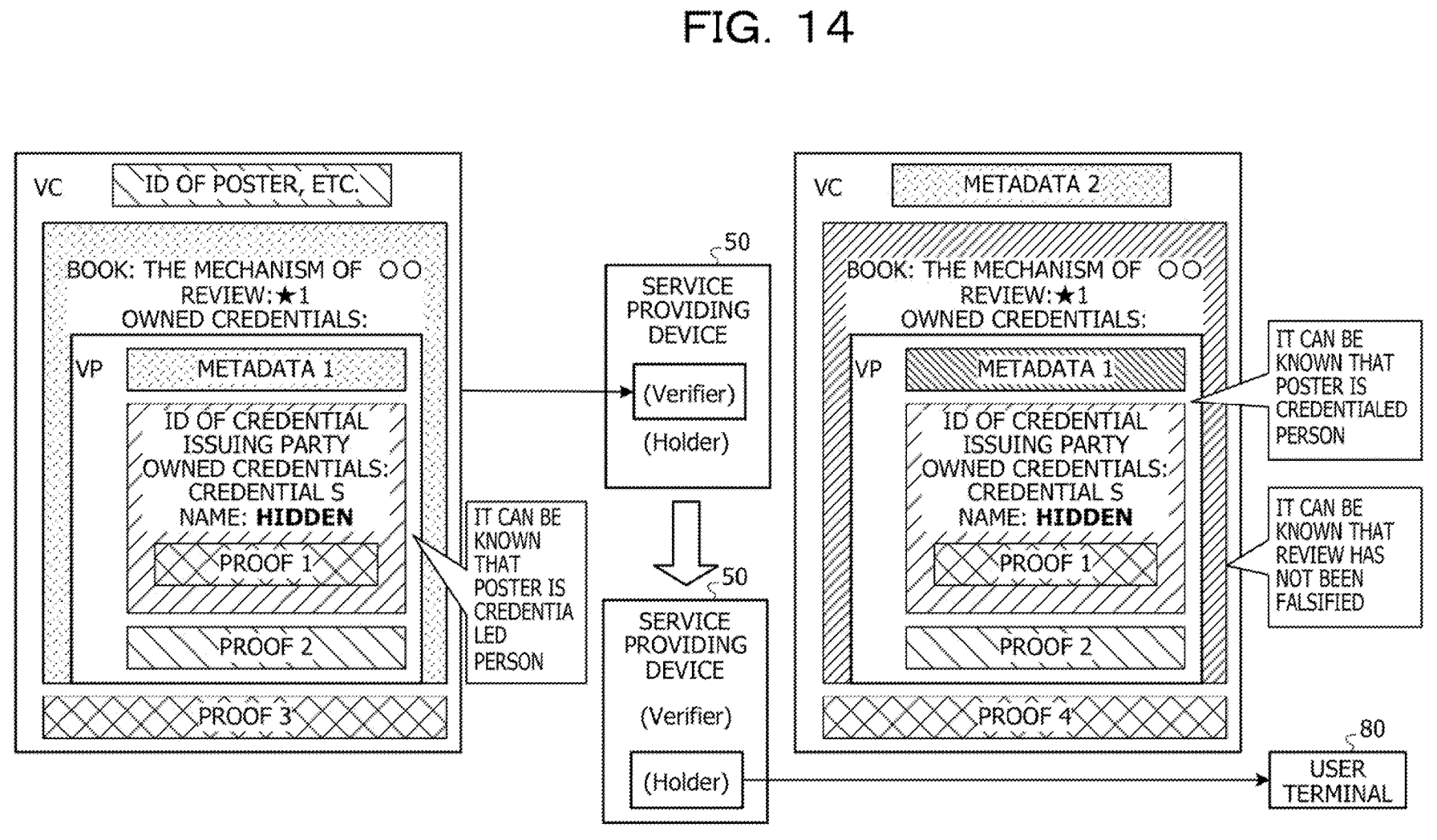

Thereafter, as illustrated in FIG. 14, the service providing device 50 that has received "VC" as "Holder" serves as "Verifier" to verify "VP" within "VC". For example, the service providing device 50 verifies whether or not "VC" is valid, by verifying "Proof 3" using the public key corresponding to the ID of the posting device 30 as "Issuer". The service providing device 50 also verifies whether or not "VP" is valid, by verifying "Proof 2" using the public key corresponding to the ID of the posting device 30 as "Holder". Furthermore, the service providing device 50 can specify that the poster is a credentialed person, by verifying "Proof 1" using the public key corresponding to the ID of the issuing device 10 as "Issuer".

In addition, the service providing device 50 that can verify "VC" as "Verifier" serves as "Holder" to provide the user terminal 80 with "VC" received from the posting device 30 that has served as "Issuer", as its own "VP". For example, the service providing device 50 transmits, to the user terminal 80, new "VP" obtained by attaching an electronic signature (Proof 4) used by the service providing device 50 as "Holder" to sign and metadata 2 relevant to "Presentation Metadata", to "review content" and the "VP" of the posting device 30 received from the posting device 30.

As a result, the user terminal 80 is allowed to verify the "VP" by serving as "Verifier". For example, the user terminal 80 verifies that the review has not been falsified, by verifying "Proof 4" using the public key corresponding to the ID of the service providing device 50 as "Holder". The user terminal 80 also verifies whether or not "VP" is valid, by verifying "Proof 2" using the public key corresponding to the ID of the posting device 30 as "Holder". Furthermore, the user terminal 80 can specify that the poster is a credentialed person, by verifying "Proof 1" using the public key corresponding to the ID of the issuing device 10 as "Issuer".

Figure 15A:
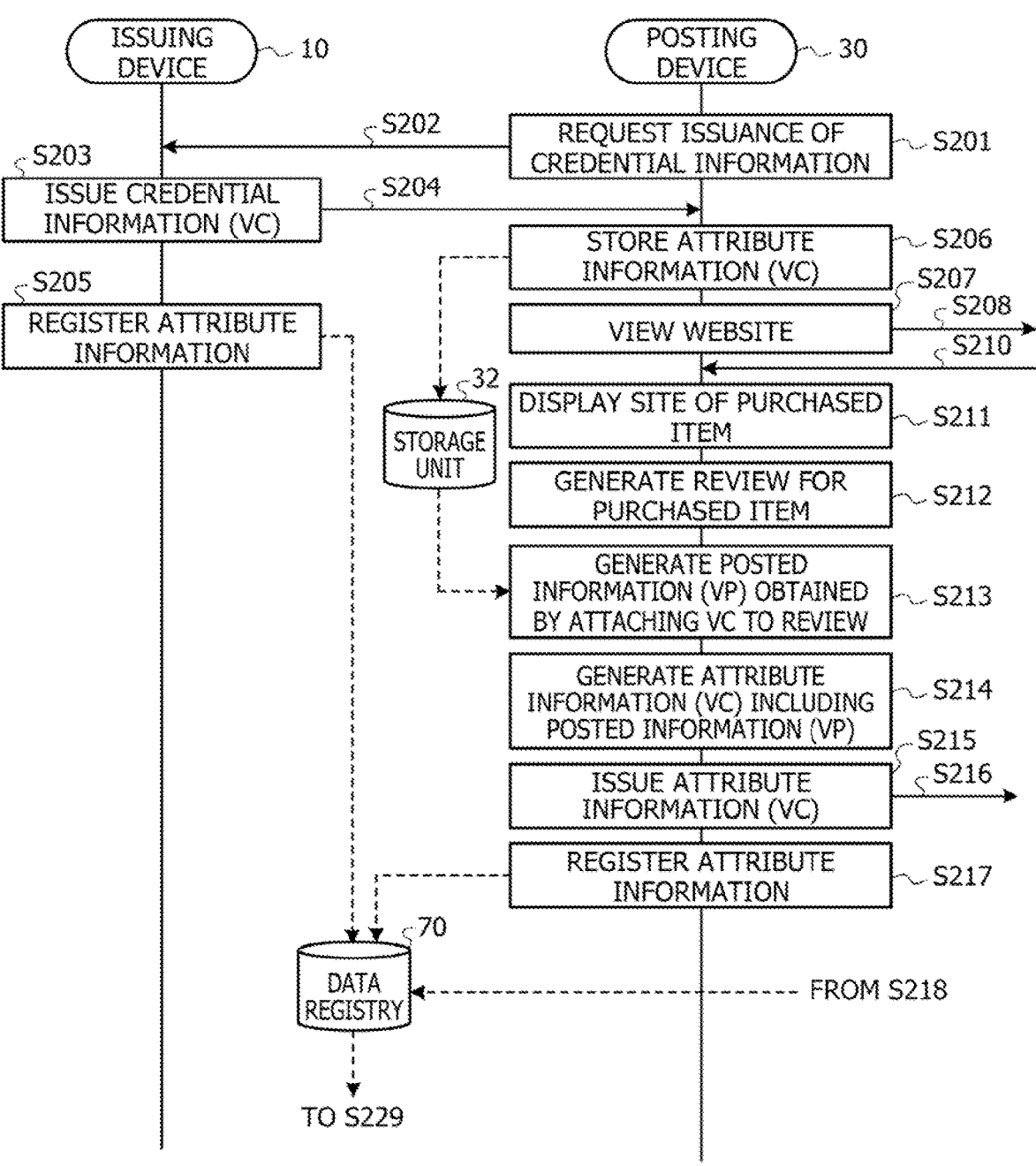
FIG. 15 (i.e., FIGS. 15A and 15B) is a sequence diagram illustrating a posting process executed by the information sharing system according to the second embodiment.
Figure 15B:
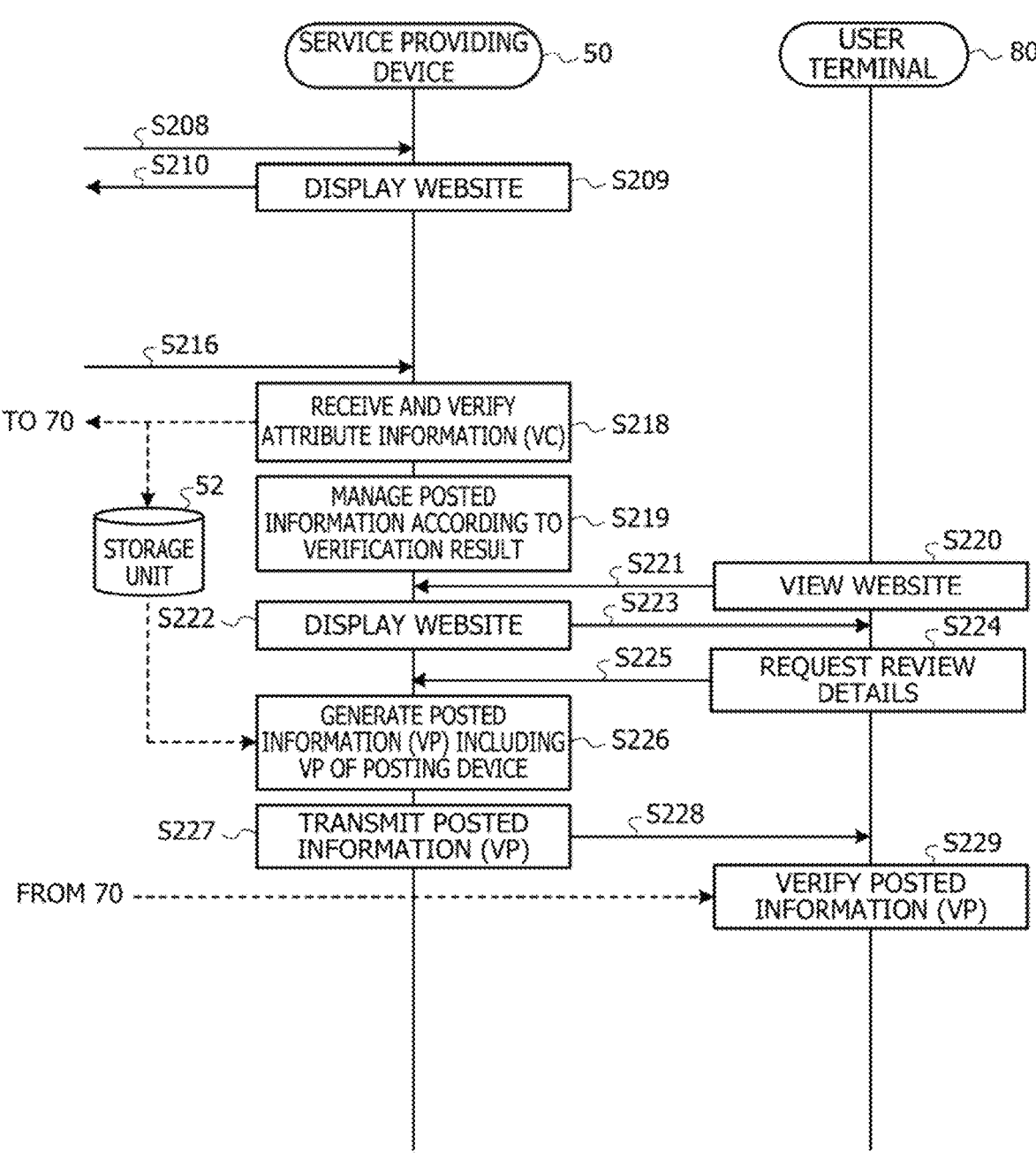

FIG. 15 (i.e., FIGS. 15A and 15B) is a sequence diagram illustrating a posting process executed by the information sharing system 1 according to the second embodiment. As illustrated in FIG. 15, when the posting device 30 transmits a request for issuing the acquired credential information to the issuing device 10 (S201 and S202), the issuing device 10 generates the attribute information (VC) including the credential information and issues the generated attribute information to the posting device 30 (S203 and S204). Note that the issuing device 10 registers information regarding the issued VC, for example, including association between the DID of the issuing party and the public key, and the like, in the data registry 70 (S205).

The posting device 30 stores the VC issued from the issuing device 10 in a storage unit 32 (S206). Then, when the posting device 30 accesses the website provided by the service providing device 50 (S207 and S208), the service providing device 50 outputs and displays the relevant website to and on the posting device 30 (S209 and S210).

Subsequently, the posting device 30 displays the site of the purchased item (S211) and generates a review for the purchased item (S212). The posting device 30 reads the VC stored in the storage unit 32 and generates posted information (review+VP (VC)) obtained by attaching the VP generated from the VC to the generated review (S213). Furthermore, the posting device 30 generates the attribute information "VC" generated from the generated posted information (VP) as "Issuer" (S214) and issues the generated attribute information to the service providing device 50 (S215 and S216). Note that the posting device 30 registers information regarding the issued VC, for example, including association between the DID of the issuing party and the public key, and the like, in the data registry 70 (S217).

The service providing device 50 stores the VC issued from the posting device 30 in a storage unit 52 and also verifies the received VC and the posted information from the posting device 30 included in the VC, using the public key of each device (S218). Then, the service providing device 50 executes management of the posted information according to the verification result, similarly to the first embodiment (S219).

Thereafter, when the user terminal 80 accesses the website provided by the service providing device 50 (S220 and S221), the service providing device 50 outputs and displays the relevant website to and on the posting device 30 (S222 and S223).

Subsequently, the user terminal 80 views the product reviews and requests presentation of detailed information on a certain review (S224 and S225). Then, the service providing device 50 generates a new VP signed with its own electronic signature, using the posted information received from the posting device 30 (S226), and transmits the generated new VP to the user terminal 80 as posted information (detailed information on the review) (S227 and S228).

Thereafter, the user terminal 80 is allowed detect the presence or absence of falsification of the review, by verifying the new posted information (VP) with the public key of the service providing device 50, and is allowed to detect the presence or absence of the credential of the poster, by verifying the "VC" issued by the issuing device, which is within the new posted information (VP), with the public key of the issuing device 10 (S229).

As described above, since the poster links the review and the VP to post the linked review and VP to the information sharing service in an anti-falsification manner, the posting device 30 of the information sharing system 1 according to the second embodiment issues the post as the VC to the information sharing service in order to make the post verifiable.

Specifically, the posting device 30 serves as Issuer of the DID infrastructure to embed its own VP into the VC and issues the VC by assuming the service providing device 50 as Holder. The service providing device 50 presents the VC (posted information) to the user terminal 80 as the VP in order to make the VC (posted information) verifiable for the user terminal 80 as Verifier. This allows the information sharing system 1 according to the second embodiment to restrain fraud in the information sharing service, using only the mechanism of the DID infrastructure.

Third Embodiment

While the embodiments have been described above, the embodiments may be carried out in diverse different forms in addition to the embodiments described above.
(Numerical Values, Etc.)

The examples of the formats of the VC and the VP, the examples of the electronic signature, the examples of verification of the electronic signature, the number of devices of each device, the posted content, the names of credentials, and the like used in the above embodiments are merely examples and can be optionally changed. In addition, the processing flow described in each flowchart may be appropriately changed unless otherwise contradicted. In addition, although the DID infrastructure has been described as an example, this is not restrictive. By transmitting the credential information and the credential information including the signature information as electronic data without using the VC or the like of the DID infrastructure, useful distribution information can be distributed.

In addition, in the above processing, by describing only the hash value of the VP in the VC, the whole VP also can be separately sent. In addition, in the above processing, by describing, in the VC, the link destination (for example, a uniform resource locator (URL)) of another database in which the VP is stored, Verifier also can separately execute verification of the VP. In addition, in the above processing, by describing only the ID of the VP in the VC, Verifier also can acquire the separately stored VP from the ID to perform verification.
(Hierarchical Posting)

For example, the above information sharing system 1 can also allow the user to understand the value of the VP of the poster, by hierarchically embedding, into the VP presented by the poster, the credential information on the issuing party of the credential information on the poster.

Figure 16:
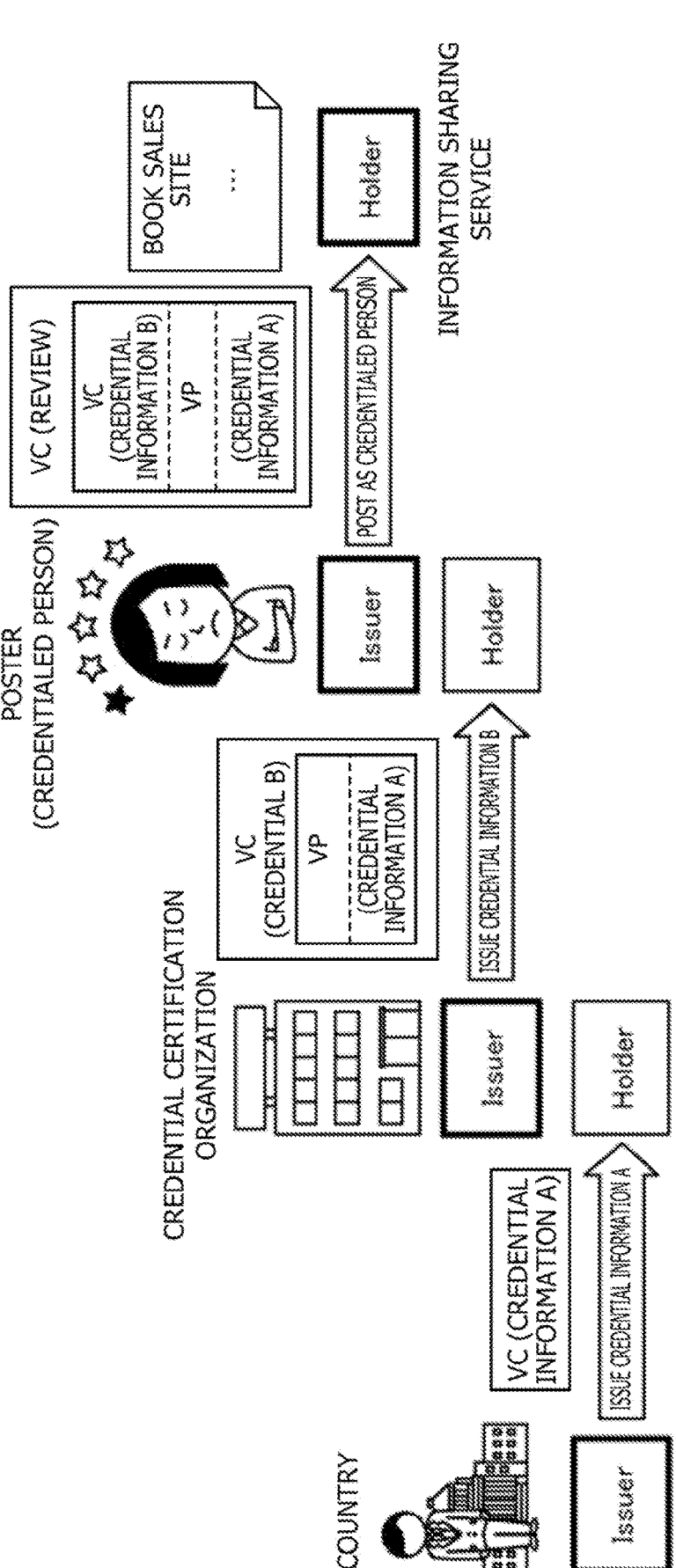
FIG. 16 is a diagram explaining posting of hierarchical posted information according to a third embodiment.

FIG. 16 is a diagram explaining posting of hierarchical posted information according to a third embodiment. As illustrated in FIG. 16, in the case of a national credential or the like, the country issues "VC" including credential information A indicating that the country is an organization that certifies the credential, as "Issuer", to a credential certification organization that is "Holder". The credential certification organization that has received this VC generates, as "Issuer", "VC" embedded with the received credential information A and its own "VP" including credential information B guaranteeing that the credentials of the poster are valid credentials, and issues the generated "VC" to the poster as a credentialed person who is "Holder".

Thereafter, the poster generates "VC" in which the credential information A and the credential information B, the own "VP" of the poster, and the review content are embedded, as "Issuer", and transmits the generated "VC" to the information sharing service (service providing device 50). As a result, the poster can post the review content while the poster is guaranteed to be a valid credentialed person. Meanwhile, by verifying the posted "VC" and each VP within "VC", the information sharing service (the service providing device 50) can specify the credentials possessed by the poster who has posted the review as to what organization has certified the credentials, whether the credentials are certified by the country, and the like, and can specify the status of the poster.
(System)

Pieces of information including the processing procedure, control procedure, specific name, various types of data and parameters described above or illustrated in the drawings can be optionally changed unless otherwise noted.

In addition, each component of each device illustrated in the drawings is functionally conceptual and does not necessarily have to be physically configured as illustrated in the drawings. That is, specific forms of distribution and integration of each device are not restricted to those illustrated in the drawings. In other words, the whole or a part of the device can be configured by being functionally or physically distributed or integrated in optional units according to various loads, use situations, or the like. For example, the post reception unit 62 and the verification unit 63 of the service providing device 50 also can be integrated.

Furthermore, all or an optional part of the processing functions performed individually in each device can be implemented by a central processing unit (CPU) and a program analyzed and executed by the CPU, or can be implemented as hardware by wired logic.
(Hardware)

Figure 17:
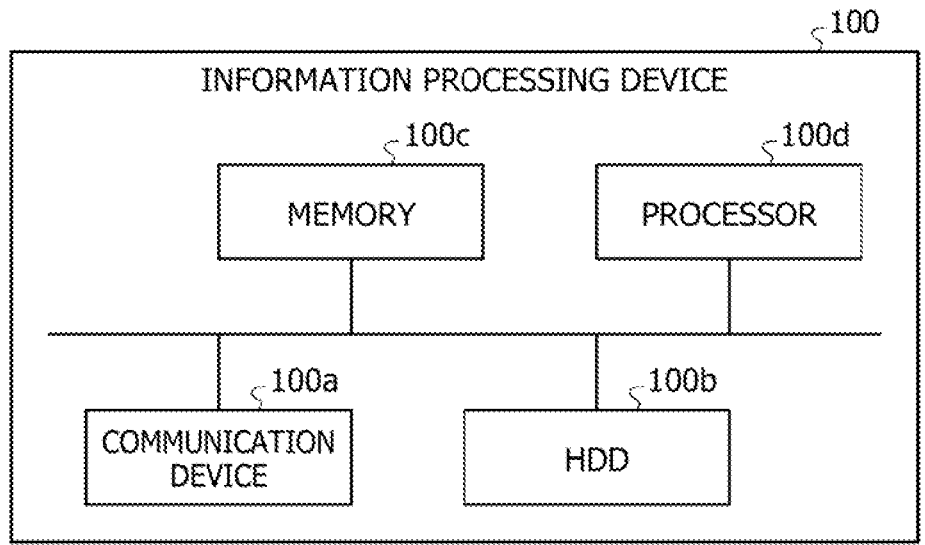
FIG. 17 is a diagram explaining a hardware configuration example.

Since each device included in the information sharing system 1 has a similar hardware configuration, each device will be described here as an information processing device 100. FIG. 17 is a diagram explaining a hardware configuration example. As illustrated in FIG. 17, the information processing device 100 includes a communication device 100*a*, a hard disk drive (HDD) 100*b*, a memory 100*c*, and a processor 100*d*. In addition, the respective units illustrated in FIG. 17 are inter-coupled by a bus or the like.

The communication device 100*a* is a network interface card or the like and communicates with another device. The HDD 100*b* stores programs and DBs for causing the functions illustrated in FIG. 4 to work.

The processor 100*d* reads a program that executes processing similar to the processing of each processing unit illustrated in FIG. 4 from the HDD 100*b* or the like and loads the read program into the memory 100*c*, thereby causing a process that executes each function described with reference to FIG. 4 or the like to work. For example, when the service providing device 50 is described as an example, this process executes a function similar to the function of each processing unit included in the service providing device 50. Specifically, the processor 100*d* reads a program having functions similar to the functions of the service providing unit 61, the post reception unit 62, the verification unit 63, the post providing unit 64, and the like from the HDD 100*b* or the like. Then, the processor 100*d* executes a process that executes processing similar to the processing of the service providing unit 61, the post reception unit 62, the verification unit 63, the post providing unit 64, and the like.

As described above, the information processing device 100 works as an information processing device that executes an information processing method by reading and executing the program. In addition, the information processing device 100 can also implement functions similar to the functions of the above-described embodiments by reading the program described above from a recording medium by a medium reading device and executing the above read program. Note that other programs mentioned in the embodiments are not limited to being executed by the information processing device 100. For example, the embodiments described above may be similarly applied also to a case where another computer or server executes the program or a case where these computer and server cooperatively execute the program.

This program may be distributed via a network such as the Internet. In addition, this program may be recorded in a computer-readable recording medium such as a hard disk, a flexible disk (FD), a compact disc read only memory (CD-ROM), a magneto-optical disk (MO), or a digital versatile disc (DVD) and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information management program for causing a computer operating as a service provider device in an information sharing system to execute processing comprising:

receiving, from a posting device in the information sharing system, distribution information obtained by attaching, to distribution content to be distributed by a user, attribute information on the user that includes first signature information that is signed by an issuing authority that issues information regarding an attribute of the user and that proves that the issuing authority has issued the attribute information;

verifying whether the attribute information on the user included in the distribution information is the attribute information issued by the issuing authority, by using the first signature information; and outputting the distribution content, based on a verification result, wherein the issuing authority, the posting device, and the computer operating as the service provider device are devices that constitute the information sharing system with a decentralized identity infrastructure as a platform and specify each other by using a respective decentralized identifier, the receiving includes receiving, as the distribution information, a first Verifiable Credential from the posting device, the first Verifiable Credential being issued by the posting device operating as an Issuer and including: the distribution content, a first Verifiable Presentation of the user, a first decentralized identifier of the posting device of the user, and second signature information signed by the posting device of the user, the first Verifiable Presentation including the attribute information of the user issued by the issuing authority and a second decentralized identifier of the issuing authority, the verifying includes:

acquiring, from a data registry of the decentralized identity infrastructure, first public key information of the posting device of the user associated with the first decentralized identifier included in the first Verifiable Credential; and verifying whether the first Verifiable Credential has been issued by the posting device of the user, by using the first public key information and the second signature information, and the outputting includes:

when a result of the verifying indicates that the first Verifiable Credential has been issued by the posting device of the user, outputting, in a response to a request from a user terminal of another user in the information sharing system, a second Verifiable Presentation to the user terminal, the second Verifiable Presentation including: the first Verifiable Credential, a third decentralized identifier of the computer operating as the service provider device, and third signature information which is signed by the computer operating as the service provider device, thereby the user terminal performs processing including:

receiving the second Verifiable Presentation from the computer operating as the service provider device;

acquiring, from the data registry of the decentralized identity infrastructure, second public key information of the computer operating as the service provider device associated with the third decentralized identifier included in the second Verifiable Presentation;

verifying whether the second Verifiable Presentation is information transmitted from the computer, by using the second public key information and the third signature information in the second Verifiable Presentation;

acquiring, from the data registry of the decentralized identity infrastructure, third public key information of the issuing authority associated with the second decentralized identifier included in the first Verifiable Presentation;

verifying whether the attribute information in the first Verifiable Presentation embedded in the second Verifiable Presentation is information issued by the issuing authority, based on the third public key information and the first signature information included in the first Verifiable Presentation embedded in the second Verifiable Presentation.

2. The non-transitory computer-readable recording medium according to claim 1, wherein the distribution content is evaluation content of the user for a product purchased via a website provided by the service provider device, and the attribute information on the user is credential information regarding a credential owned by the user, the issuing authority is a certification authority that certifies the credential, the distribution information is posted information configured to post the evaluation content for the purchased product to the website, the receiving of the distribution information includes receiving the posted information obtained by attaching the credential information on the user that includes the first signature information of the issuing authority, to the evaluation content for the purchased product, and the verifying of the computer includes verifying whether the posted information is a post from the user having the credential information issued by a valid authority, by using the first signature information.

3. An information management method implemented by a computer operating as a service provider device in an information sharing system, the information management method comprising:

receiving, from a posting device in the information sharing system, distribution information obtained by attaching, to distribution content to be distributed by a user, attribute information on the user that includes first signature information that is signed by an issuing authority that issues information regarding an attribute of the user and that proves that the issuing authority has issued the attribute information;

verifying whether the attribute information on the user included in the distribution information is the attribute information issued by the issuing authority, by using the first signature information; and outputting the distribution content, based on a verification result, wherein the issuing authority, the posting device, and the computer operating as the service provider device are devices that constitute the information sharing system with a decentralized identity infrastructure as a platform and specify each other by using a respective decentralized identifier, the receiving includes receiving, as the distribution information, a first Verifiable Credential from the posting device, the first Verifiable Credential being issued by the posting device operating as an Issuer and including: the distribution content, a first Verifiable Presentation of the user, a first decentralized identifier of the posting device of the user, and second signature information signed by the posting device of the user, the first Verifiable Presentation including the attribute information of the user issued by the issuing authority and a second decentralized identifier of the issuing authority, the verifying includes:

acquiring, from a data registry of the decentralized identity infrastructure, first public key information of the posting device of the user associated with the first decentralized identifier included in the first Verifiable Credential; and verifying whether the first Verifiable Credential has been issued by the posting device of the user, by using the first public key information and the second signature information, and the outputting includes: when a result of the verifying indicates that the first Verifiable Credential has been issued by the posting device of the user, outputting, in a response to a request from a user terminal of another user in the information sharing system, a second Verifiable Presentation to the user terminal, the second Verifiable Presentation including: the first Verifiable Credential, a third decentralized identifier of the computer operating as the service provider device, and third signature information which is signed by the computer operating as the service provider device, thereby the user terminal performs processing including:

receiving the second Verifiable Presentation from the computer operating as the service provider device;

acquiring, from the data registry of the decentralized identity infrastructure, second public key information of the computer operating as the service provider device associated with the third decentralized identifier included in the second Verifiable Presentation;

verifying whether the second Verifiable Presentation is information transmitted from the computer, by using the second public key information and the third signature information in the second Verifiable Presentation;

acquiring, from the data registry of the decentralized identity infrastructure, third public key information of the issuing authority associated with the second decentralized identifier included in the first Verifiable Presentation;

verifying whether the attribute information in the first Verifiable Presentation embedded in the second Verifiable Presentation is information issued by the issuing authority, based on the third public key information and the first signature information included in the first Verifiable Presentation embedded in the second Verifiable Presentation.

4. An information management apparatus being a computer operating as a service provider device in an information sharing system, the information management apparatus comprising:

a memory; and a processor coupled to the memory, the processor being configured to perform processing including:

receiving, from a posting device in the information sharing system, distribution information obtained by attaching, to distribution content to be distributed by a user, attribute information on the user that includes first signature information that is signed by an issuing authority that issues information regarding an attribute of the user and that proves that the issuing authority has issued the attribute information;

verifying whether the attribute information on the user included in the distribution information is the attribute information issued by the issuing authority, by using the first signature information; and outputting the distribution content, based on a verification result, wherein the issuing authority, the posting device, and the computer operating as the service provider device are devices that constitute the information sharing system with a decentralized identity infrastructure as a platform and specify each other by using a respective decentralized identifier, the receiving includes receiving, as the distribution information, a first Verifiable Credential from the posting device, the first Verifiable Credential being issued by the posting device operating as an Issuer and including: the distribution content, a first Verifiable Presentation of the user, a first decentralized identifier of the posting device of the user, and second signature information signed by the posting device of the user, the first Verifiable Presentation including the attribute information of the user issued by the issuing authority and a second decentralized identifier of the issuing authority, the verifying includes:

acquiring, from a data registry of the decentralized identity infrastructure, first public key information of the posting device of the user associated with the first decentralized identifier included in the first Verifiable Credential; and verifying whether the first Verifiable Credential has been issued by the posting device of the user, by using the first public key information and the second signature information, and the outputting includes: when a result of the verifying indicates that the first Verifiable Credential has been issued by the posting device of the user, outputting, in a response to a request from a user terminal of another user in the information sharing system, a second Verifiable Presentation to the user terminal, the second Verifiable Presentation including: the first Verifiable Credential, a third decentralized identifier of the computer operating as the service provider device, and third signature information which is signed by the computer operating as the service provider device, thereby the user terminal performs processing including:

receiving the second Verifiable Presentation from the computer operating as the service provider device;

acquiring, from the data registry of the decentralized identity infrastructure, second public key information of the computer operating as the service provider device associated with the third decentralized identifier included in the second Verifiable Presentation;

verifying whether the second Verifiable Presentation is information transmitted from the computer, by using the second public key information and the third signature information in the second Verifiable Presentation;

acquiring, from the data registry of the decentralized identity infrastructure, third public key information of the issuing authority associated with the second decentralized identifier included in the first Verifiable Presentation;

verifying whether the attribute information in the first Verifiable Presentation embedded in the second Verifiable Presentation is information issued by the issuing authority, based on the third public key information and the first signature information included in the first Verifiable Presentation embedded in the second Verifiable Presentation.

5. An information sharing system comprising:

a first computer operating as a posting device in the information sharing system;

a second computer operating as a service provider device in the information sharing system; and a third computer operating as a user terminal, wherein the first computer includes a first hardware processor configured to perform processing including transmitting, to the second computer operating as the service provider device, distribution information obtained by attaching, to distribution content to be distributed by a user of the posting device, attribute information on the user that includes first signature information that is signed by an issuing authority that issues information regarding an attribute of the user and that proves that the issuing authority has issued the attribute information, the second computer includes a second hardware processor configured to perform processing including:

receiving the distribution information from the first computer operating as the posting device;

verifying whether the attribute information on the user included in the distribution information is the attribute information issued by the issuing authority, by using the first signature information; and outputting the distribution content, based on a verification result, wherein the issuing authority, the posting device, and the second computer operating as the service provider device are devices that constitute the information sharing system with a decentralized identity infrastructure as a platform and specify each other by using a respective decentralized identifier, the receiving includes receiving, as the distribution information, a first Verifiable Credential from the first computer operating as the posting device, the first Verifiable Credential being issued by the posting device operating as an Issuer and including: the distribution content, a first Verifiable Presentation of the user, a first decentralized identifier of the posting device of the user, and second signature information signed by the first computer operating as the posting device of the user, the first Verifiable Presentation including the attribute information of the user issued by the issuing authority and a second decentralized identifier of the issuing authority, the verifying includes:

acquiring, from a data registry of the decentralized identity infrastructure, first public key information of the posting device of the user associated with the first decentralized identifier included in the first Verifiable Credential; and verifying whether the first Verifiable Credential has been issued by the posting device of the user, by using the first public key information and the second signature information, the outputting includes:

when a result of the verifying indicates that the first Verifiable Credential has been issued by the posting device of the user, outputting, in a response to a request from a user terminal of another user in the information sharing system, a second Verifiable Presentation to the user terminal, the second Verifiable Presentation including: the first Verifiable Credential, a third decentralized identifier of the second computer operating as the service provider device, and third signature information which is signed by the second computer operating as the service provider device, and the third computer includes a third hardware processor configured to perform processing including:

receiving the second Verifiable Presentation from the second computer operating as the service provider device;

acquiring, from the data registry of the decentralized identity infrastructure, second public key information of the second computer operating as the service provider device associated with the third decentralized identifier included in the second Verifiable Presentation;

verifying whether the second Verifiable Presentation is information transmitted from the second computer, by using the second public key information and the third signature information in the second Verifiable Presentation;

acquiring, from the data registry of the decentralized identity infrastructure, third public key information of the issuing authority associated with the second decentralized identifier included in the first Verifiable Presentation;

verifying whether the attribute information in the first Verifiable Presentation embedded in the second Verifiable Presentation is information issued by the issuing authority, based on the third public key information and the first signature information included in the first Verifiable Presentation embedded in the second Verifiable Presentation.

\* \* \* \* \*